United States Patent
Yamamoto

(10) Patent No.: US 11,125,595 B2
(45) Date of Patent: Sep. 21, 2021

(54) FLOW RATE MEASUREMENT DEVICE AND EMBEDDED GAS METER

(71) Applicant: OMRON CORPORATION, Kyoto (JP)

(72) Inventor: Katsuyuki Yamamoto, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/965,317

(22) PCT Filed: Feb. 8, 2019

(86) PCT No.: PCT/JP2019/004738
§ 371 (c)(1),
(2) Date: Jul. 28, 2020

(87) PCT Pub. No.: WO2019/156243
PCT Pub. Date: Aug. 15, 2019

(65) Prior Publication Data
US 2021/0116283 A1    Apr. 22, 2021

(30) Foreign Application Priority Data
Feb. 9, 2018 (JP) .............................. JP2018-021976

(51) Int. Cl.
*G01F 1/696* (2006.01)
*G01F 1/684* (2006.01)
*G01F 1/688* (2006.01)

(52) U.S. Cl.
CPC ............ *G01F 1/696* (2013.01); *G01F 1/6845* (2013.01); *G01F 1/6888* (2013.01)

(58) Field of Classification Search
CPC ....... G01F 1/6845; G01F 1/6888; G01F 1/696
See application file for complete search history.

(56) References Cited

U.S. PATENT DOCUMENTS

| 5,191,793 A | * | 3/1993 | Drexel | G01F 1/6847 |
| | | | | 73/204.22 |
| 7,000,465 B1 | * | 2/2006 | L'Bassi | G01F 1/6847 |
| | | | | 73/204.27 |

(Continued)

FOREIGN PATENT DOCUMENTS

| JP | 3658321 B2 | 6/2005 |
| JP | 2008-506117 A | 2/2008 |

(Continued)

OTHER PUBLICATIONS

English translation of the International Search Report of a related international application PCT/JP2019/004738 dated Mar. 5, 2019.

(Continued)

*Primary Examiner* — Francis C Gray
(74) *Attorney, Agent, or Firm* — Metrolex IP Law Group, PLLC

(57) ABSTRACT

The flow rate measurement device according to one aspect of the present invention comprises a heating unit for heating a fluid; temperature sensing units that are provided flanking the heating unit in the direction of fluid flow, and that sense the temperature of the heated fluid; a flow rate calculation unit that calculates the flow rate of the fluid on the basis of a sensing signals outputted from the temperature sensing units; angle calculation unit for calculating the tilt angle of the temperature sensing units with respect to a specific reference plane; a storage unit that stores the relation between the flow rate, the tilt angle, and a flow rate correction value; and a flow rate correction unit that corrects the flow rate by using the flow rate correction value stored in the storage unit.

7 Claims, 15 Drawing Sheets

(56) References Cited

U.S. PATENT DOCUMENTS

| | | | |
|---|---|---|---|
| 7,222,029 B2* | 5/2007 | Larson | G01F 1/688 |
| | | | 702/45 |
| 2002/0121137 A1 | 9/2002 | Fujiwara et al. | |
| 2007/0219650 A1* | 9/2007 | Wang | G05D 7/0635 |
| | | | 700/73 |
| 2019/0226891 A1* | 7/2019 | Gaugler | G01F 1/667 |

FOREIGN PATENT DOCUMENTS

| | | |
|---|---|---|
| JP | 2012-247266 A | 12/2012 |
| JP | 5459955 B2 | 4/2014 |
| JP | 2016-217812 A | 12/2016 |
| JP | 2016-217813 A | 12/2016 |
| JP | 2016-217814 A | 12/2016 |

OTHER PUBLICATIONS

Written Opinion of a related international application PCT/JP2019/004738 dated Mar. 5, 2019.

* cited by examiner

CONVECTION

| OUTPUT OF THERMOPILE 7A | INSTALLATION ANGLE OF FLOW RATE MEASUREMENT DEVICE 100 |
|---|---|
| A1 | B1 |
| A2 | B2 |
| A3 | B3 |
| ⋮ | ⋮ |

|  | FLOW RATE A | FLOW RATE B | FLOW RATE C |
|---|---|---|---|
| INCLINATION 0° | X1 | X2 | X3 |
| INCLINATION 90° | X4 | X5 | X6 |
| INCLINATION 180° | X7 | X8 | X9 |
| INCLINATION 270° | X10 | X11 | X12 |

FIG. 10B

|  | PRESSURE A | PRESSURE B | PRESSURE C |
|---|---|---|---|
| INCLINATION 0° | Y 1 | Y 2 | Y 3 |
| INCLINATION 90° | Y 4 | Y 5 | Y 6 |
| INCLINATION 180° | Y 7 | Y 8 | Y 9 |
| INCLINATION 270° | Y 1 0 | Y 1 1 | Y 1 2 |

FIG. 10C

|  | GAS A | GAS B | GAS C |
|---|---|---|---|
| INCLINATION 0° | Z 1 | Z 2 | Z 3 |
| INCLINATION 90° | Z 4 | Z 5 | Z 6 |
| INCLINATION 180° | Z 7 | Z 8 | Z 9 |
| INCLINATION 270° | Z 1 0 | Z 1 1 | Z 1 2 |

FIG. 10D

|  | TEMPERATURE A | TEMPERATURE B | TEMPERATURE C |
|---|---|---|---|
| INCLINATION 0° | A 1 | A 2 | A 3 |
| INCLINATION 90° | A 4 | A 5 | A 6 |
| INCLINATION 180° | A 7 | A 8 | A 9 |
| INCLINATION 270° | A 1 0 | A 1 1 | A 1 2 |

FLUID

FLOW RATE MEASUREMENT DEVICE AND EMBEDDED GAS METER

FIELD

The present invention relates to a flow rate measurement device and an embedded gas meter.

BACKGROUND

An example of a method for calculating the flow rate of a fluid flowing through a flow path is a method in which a thermal flow sensor comprising a heater and a thermopile is provided in the flow path, the fluid is heated by the heater, information about the temperature distribution of the heated fluid is obtained by the thermopile, and the flow rate of the fluid is calculated on the basis of the obtained temperature distribution information. An invention in which a thermal flow sensor comprising a heater and a thermopile is provided in a flow path is disclosed in Patent Literature 1 to 4, for example.

CITATION LIST

Patent Literature

Patent Literature 1: Japanese Patent No. 3,658,321
Patent Literature 2: JP-A 2012-247266
Patent Literature 3: JP-A 2016-217813
Patent Literature 4: JP-A 2016-217814

SUMMARY

When a fluid is heated by a heater, convection may occur in the vicinity of the heater, whereby heat is carried upward with respect to the horizontal plane. Consequently, when thermal flow sensors are installed in a flow path, if their installation angles are not the same, there is the risk that the output value from the thermopile may be affected by the heat carried by convection. That is, the inventors found that the measurement result for the flow rate in a flow path will vary depending on the installation angle of the thermal flow sensor, and the flow rate cannot be measured accurately.

The present invention, in one aspect, was conceived in view of this situation, and it is an object thereof to provide a flow rate measurement technique that is highly accurate even when the installation angle of the thermal flow sensor varies.

The present invention adopts the following configuration in order to solve the above problem.

That is, the flow rate measurement device according to one aspect of the present invention comprises a heating unit for heating a fluid, temperature sensing units that are provided flanking the heating unit in the direction of fluid flow, and that sense the temperature of the heated fluid, a flow rate calculation unit that calculates the flow rate of the fluid on the basis of a sensing signal outputted from the temperature sensing unit, angle calculation unit for calculating the tilt angle of the temperature sensing unit with respect to a specific reference plane, a storage unit that stores the relation between the flow rate, the tilt angle, and a flow rate correction value, and a flow rate correction unit that corrects the flow rate by using the flow rate correction value stored in the storage unit.

Here, the specific reference plane is a reference plane that is determined in advance, and is, for example, a horizontal plane or a vertical plane.

With this configuration, the distribution of heat caused by the flow of the fluid can be sensed by the temperature sensing unit, and the flow rate of the fluid can be calculated. Also, the tilt angle of the temperature sensing unit with respect to the specific reference plane can be calculated. Then, the most suitable flow rate correction value corresponding to the calculated flow rate and the tilt angle is selected from among the flow rate correction values stored in the storage unit, and the selected flow rate correction value can be used to correct the flow rate.

That is, this configuration allows correction to be performed for eliminating the influence of heat movement caused by convection from the calculated flow rate. This correction is based on the tilt angle. Therefore, the flow rate can be accurately corrected according to the tilt angle, and the flow rate can be calculated with high accuracy.

In the flow rate measurement device according to the above-mentioned aspect, the angle calculation unit may calculate the tilt angle on the basis of the output of the temperature sensing unit when no fluid is flowing.

With this configuration, the output of the temperature sensing unit indicates the distribution of heat that is caused by convection and that is not affected by the flow of the fluid. Therefore, the tilt angle can be calculated with high accuracy.

The flow rate measurement device according to one aspect may further comprise a characteristic value calculation unit that calculates a characteristic value of a fluid on the basis of the sensing signal outputted from the temperature sensing unit, wherein the storage unit further stores the relation between the characteristic value, the tilt angle, and a characteristic correction value, and the flow rate correction unit further corrects the flow rate by using the characteristic correction value stored in the storage unit.

With this configuration, the characteristic value can be calculated in addition to the flow rate of the fluid. Then, a characteristic correction value corresponding to the calculated characteristic value and the tilt angle is selected from among the characteristic correction values stored in the storage unit, and the flow rate can be further corrected using the selected characteristic correction value.

That is, with this configuration, correction can be performed to remove the influence of heat movement caused by convection from the calculated flow rate. This correction is based on the fluid properties and the tilt angle. Consequently, the flow rate can be accurately corrected according to the tilt angle. Also, the accuracy of the calculation of the flow rate can be further improved by adding this correction to correction based on the flow rate of the fluid and the tilt angle.

The flow rate measurement device according to the above-mentioned aspect may further comprise a second heating unit, second temperature sensing units that are provided flanking the second heating unit in the direction of blocking the flow of fluid, and a characteristic value calculation unit that calculates a characteristic value of the fluid on the basis of the sensing signal outputted from the second temperature sensing unit, wherein the angle calculation unit further calculates the tilt angle of the second temperature sensing unit with respect to a specific reference plane on the basis of the output of the second temperature sensing unit.

With this configuration, the output of the second temperature sensing units is an output in which the influence of the change in the temperature distribution due to the flow of the fluid has been reduced. That is, the tilt angle and the characteristic value of the fluid calculated using the output of the second temperature sensing units are highly accurate values. Therefore, when correcting the flow rate, this characteristic value and the tilt angle can be used to improve the accuracy of the flow rate correction.

Also, with this configuration, two tilt angles can be calculated. Consequently, the tilt of the flow rate measurement device can be ascertained three-dimensionally. The flow rate can then be corrected according to the two tilt angles. Therefore, the flow rate can be accurately corrected, and the flow rate can be calculated with high accuracy.

The flow rate measurement device according to the above-mentioned aspect may comprise a heating unit for heating a fluid, temperature sensing units that are provided flanking the heating unit in the direction of fluid flow and that sense the temperature of the heated fluid, a flow rate calculation unit that calculates the flow rate of the fluid on the basis of the sensing signals outputted from the temperature sensing units, a second heating unit, second temperature sensing units provided flanking the second heating unit in the direction of blocking the flow of fluid, a characteristic value calculation unit that calculates a characteristic value of the fluid on the basis of the sensing signals outputted from the second temperature sensing units, angle calculation unit for calculating the tilt angle of the second temperature sensing units with respect to a specific reference plane on the basis of the output of the second temperature sensing units, a storage unit that stores the relation between the flow rate, the tilt angle of the second temperature sensing units, and the flow rate correction value, and also stores the relation between the characteristic value, the tilt angle of the second temperature sensing units, and the characteristic correction value, and a flow rate correction unit that corrects the flow rate by using the flow rate correction value and the characteristic correction value stored in the storage unit.

With this configuration, the distribution of heat caused by the flow of the fluid can be sensed by the temperature sensing units, and the flow rate of the fluid can be calculated. Also, the tilt angle and the characteristic value can be calculated on the basis of the output of the second temperature sensing units. Here, the output of the second temperature sensing units is an output in which the influence of the change in the temperature distribution due to the fluid flow has been reduced. That is, the tilt angle and the characteristic value of the fluid calculated using the output of the second temperature sensing units are highly accurate values. The most suitable flow rate correction value and characteristic correction value corresponding to the calculated flow rate, characteristic value, and tilt angle can then be selected from among the flow rate correction values and the characteristic correction values stored in the storage unit, and the flow rate can be corrected using the selected flow rate correction value and characteristic correction value. That is, since the characteristic value and the tilt angle used when correcting the flow rate are highly accurate values, the accuracy of the flow rate correction is high.

In the flow rate measurement device according to the above-mentioned aspect, the characteristic value may represent at least one of the pressure, type, and temperature of the fluid.

With this configuration, the flow rate can be corrected on the basis of at least one of the fluid pressure, the fluid type, and the fluid temperature. That is, since the flow rate can be corrected on the basis of a plurality of characteristics of the fluid, the accuracy of the flow rate calculation can be increased.

Also, the present invention may be an embedded gas meter that is embedded in the ground, comprising a flow pipe through which the gas entering the embedded gas meter flows, and the above-mentioned flow rate measurement device, wherein the flow rate measurement device is installed in the flow pipe and senses the flow rate of gas flowing through the flow pipe.

With this configuration, since the gas meter is sealed, the inside of the flow pipe in the gas meter is unlikely to be affected by changes in the external environment, and the environment (temperature, humidity, etc.) is more stable. Therefore, highly accurate flow rate measurement is possible with this configuration.

Also, with this configuration, the flow pipe can be made as long as possible. Therefore, the flow of gas through this flow pipe is more stable than the flow of gas through a curved pipe. Therefore, highly accurate flow rate measurement is possible with this configuration.

Also, with this configuration, when various kinds of sensor are provided inside, the flow rate measurement device and the various sensors can be disposed linearly. Consequently, it is easier to disposed the flow pipe linearly than when the various sensors are disposed not in a straight line but irregularly. That is, this configuration has a simple structure, and it is easy to reduce the number of members that form this configuration. Therefore, the measurement of gas is more efficient, and the manufacturing cost can be lowered.

Also, with this configuration, since the flow rate of gas is sensed by a single flow rate measurement device, a more compact size is achieved. Also, a horizontal piping structure is possible in which the influence of flow rate measurement error due to convection is reduced.

Also, when a conventional gas meter is embedded in the ground, it is considered difficult to recognize from above ground the installation angle of the flow rate measurement device provided to the gas meter. Therefore, if the installation angle of the flow rate measurement device is inclined with respect to the horizontal plane, it is considered difficult to correct the measured flow rate according to this inclination. On the other hand, with this configuration, even if the installation angle of the flow rate measurement device is tilted with respect to the horizontal plane, the gas measured by the flow rate measurement device will be automatically corrected according to the installation angle of the flow rate measurement device. This allows for highly accurate flow rate measurement. Also, even in a situation where the flow rate measurement device is difficult to install at the desired angle, such as when the ground surface is sloped to start with, the gas measured by the flow rate measurement device will be automatically corrected according to the installation angle of the flow rate measurement device. That is, with this configuration, highly accurate flow rate measurement is possible regardless of the installation environment, which makes this device very convenient.

ADVANTAGEOUS EFFECTS

The present invention provides a flow rate measurement technique that is highly accurate even when the installation angles of the thermal flow sensors are different.

BRIEF DESCRIPTION OF THE DRAWINGS

FIG. 10B schematically illustrates an example of pressure correction values;

FIG. 10C schematically illustrates an example of fluid type correction values;

FIG. 10D schematically illustrates an example of temperature correction values;

DETAILED DESCRIPTION

An embodiment according to one aspect of the present invention (hereinafter also referred to as "this embodiment") will now be described with reference to the drawings. However, the embodiment described below is merely an example of the present invention in all respects. It should go without saying that various improvements and modifications can be made without departing from the scope of the present invention. That is, in implementing the present invention, a specific configuration according to the embodiment may be appropriately adopted.

§ 1 Application Example

Figure 1:
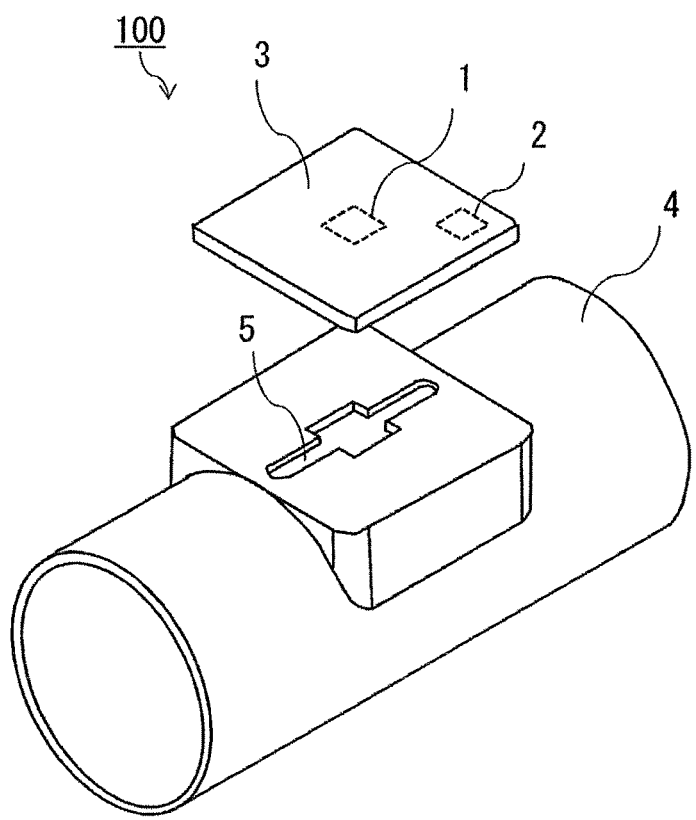
FIG. 1 schematically illustrates an example of a flow rate measurement device according to an embodiment.

An example of a situation in which the present invention is applied will be described with reference to FIG. 1. FIG. 1 schematically illustrates an example of a flow rate measurement device 100 according to this embodiment. The flow rate measurement device 100 comprises a sensing element 1, a control unit 2, and a circuit board 3 on which the sensing element 1 and the control unit 2 are mounted. A certain fluid flows through a flow pipe member 4. One flow path 5 is formed at the upper portion of the flow pipe member 4. The flow rate measurement device 100 is fixed to the flow pipe member 4 so that the sensing element 1 is located within the flow path 5. Also, the sensing element 1 comprises a micro-heater and thermopiles that are provided flanking the micro-heater. The thermopiles are substantially rectangular in shape. The sensing element 1 is a so-called thermal flow sensor.

Here, the flow rate of the fluid is calculated as follows. When the micro-heater is actuated while a fluid is flowing through the flow pipe member 4, the area near the micro-heater is heated. Then, the thermopiles output signals related to the temperature in the vicinity of the micro-heater. When heating is performed by the micro-heater while the fluid is flowing, the heat from the micro-heater is diffused unevenly due to the influence of the flow of the fluid. This biased heat diffusion is measured by the thermopiles, and the flow rate of the fluid is calculated.

Figure 2:
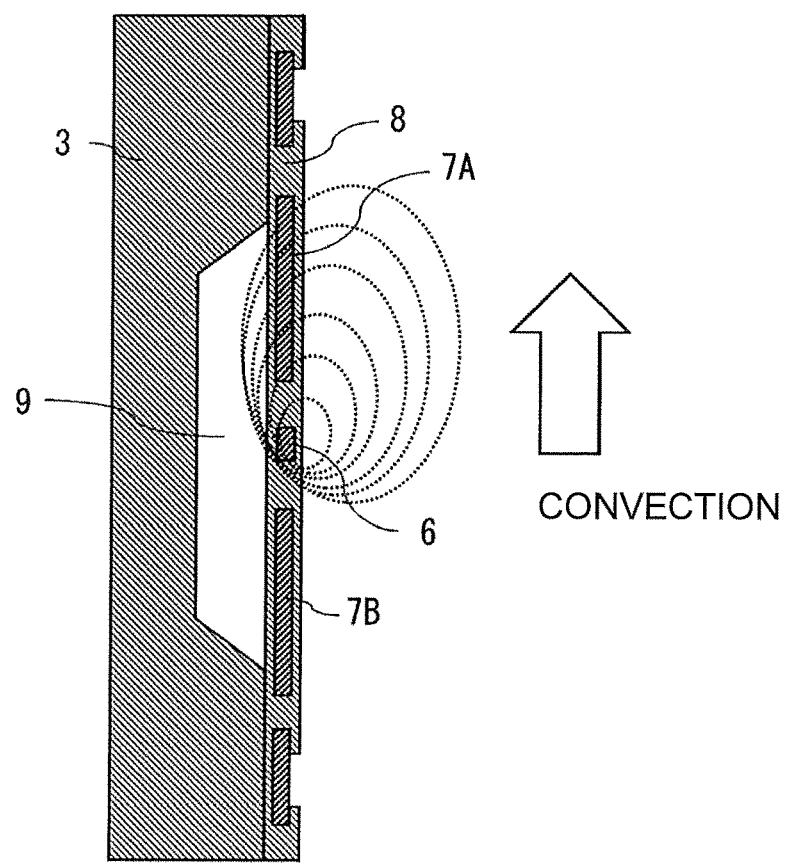
FIG. 2 schematically illustrates an example in which the flow rate measurement device is installed in a flow path.

When the fluid is heated by the micro-heater, however, convection occurs in the vicinity of the micro-heater, and the heat is carried upward with respect to the horizontal plane. FIG. 2 shows an example in which the flow rate measurement device 100 is installed in the flow path 5 such that the angle of the direction in which the micro-heater 6 and the thermopiles 7A and 7B are arranged with respect to the horizontal plane is approximately 90 degrees. When the flow rate measurement device 100 is installed at the above angle, the thermopile 7A or 7B does not purely sense the diffusion of heat caused by the flow of fluid, and instead senses the diffusion of heat that includes movement of the heat caused by convection. That is, it is necessary to take the influence of heat caused by convection into account in correcting the flow rate.

Also, in the example shown in FIG. 2, the installation angle of the flow rate measurement device 100 is approximately 90 degrees, but even when the installation angle is something other than 90 degrees, the influence of heat movement caused by convection will be included in the output of the thermopiles 7A and 7B, and the extent of that influence will depend on the installation angle. That is, it is necessary to calculate the installation angle of the flow rate measurement device 100 and correct the flow rate according to the installation angle. Also, the degree of influence of heat movement caused by convection, which is included in the output of the thermopile 7A or 7B, will also depend on the flow rate and characteristics of the fluid. This means that it is necessary to correct the flow rate by taking into account the flow rate and characteristics of the fluid.

The installation angle of the flow rate measurement device 100 is calculated as follows. First, in calculating the installation angle of the flow rate measurement device 100, the relation between the output of the thermopile 7A or 7B and the installation angle of the flow rate measurement device 100 is created in advance. To create this relation, first, the flow rate measurement device 100 is installed at a certain installation angle inside the flow path 5. Then, the flow of fluid is stopped at the place where the flow rate measurement device 100 is provided. Then, the micro-heater 6 is actuated to heat the area around the micro-heater 6. This results in convection in the vicinity of the micro-heater 6, and the heat is carried upward with respect to the horizontal plane. Then, information about the heat distribution generated by convection is sensed by the thermopile 7A or 7B, and a specific signal is outputted from the thermopile 7A or 7B. The relation between the output of the thermopile 7A or 7B and the installation angle of the flow rate measurement device 100 is then stored. The installation angle of the flow rate measurement device 100 is then changed, and the above procedure is repeated. The relation between the output of the thermopile 7A or 7B and the installation angle of the flow rate measurement device 100 is created in advance by this procedure.

Next, the installation angle of the flow rate measurement device 100 can be found as follows. First, the flow rate measurement device 100 is installed in the flow path 5, and the flow of fluid is stopped at the place where the flow rate measurement device 100 is provided. The micro-heater 6 is then actuated to heat the area around the micro-heater 6. This results in convection in the vicinity of the micro-heater 6, and the heat is carried upward with respect to the horizontal plane. Then, information about the heat distribution caused by convection is sensed by the thermopile 7A or 7B, and a specific signal is outputted from the thermopile 7A or 7B. Then, the installation angle of the flow rate measurement device 100 is calculated by using the output of the thermopile 7A or 7B and the previously created relation between the output of the thermopile 7A or 7B and the installation angle of the flow rate measurement device 100.

The diffusion of heat in the vicinity of the micro-heater 6 depends not only on the flow rate of the fluid, but also on the characteristics of the fluid. In other words, the characteristics of the fluid can be calculated from the output of the thermopile 7A or 7B.

Correction for eliminating the influence of heat movement caused by convection from the calculated flow rate is performed by using the installation angle of the flow rate measurement device 100 calculated above and the characteristics of the fluid. In correcting the flow rate, a correction coefficient related to the characteristics of the fluid and the installation angle is determined in advance. Then, the flow rate is corrected by multiplying the flow rate by this correction coefficient. This procedure allows a highly accurate flow rate to be calculated.

As described above, this embodiment provides a flow rate measurement technique that is highly accurate even when the installation angles of the thermal flow sensors are different.

§ 2 Configuration Example

Hardware Configuration

Next, an example of the flow rate measurement device according to this embodiment will be described. The flow rate measurement device 100 according to this embodiment is provided in a flow pipe inside a gas meter, an air conditioner (installed in a duct space), a medical device, or a fuel cell, and can measure the flow rate of a fluid flowing through the flow pipe. As shown in FIG. 1, the flow rate measurement device 100 comprises a sensing element 1, a control unit 2, and a circuit board 3 on which the sensing element 1 and the control unit 2 are mounted.

Figure 3:
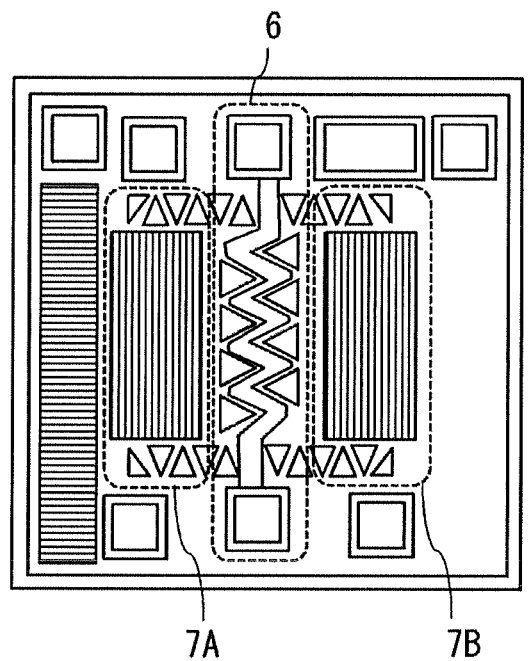
FIG. 3 schematically illustrates an example of a detail view of the sensing elements according to an embodiment.

FIG. 3 schematically illustrates an example of a detail view of the sensing element 1 according to this embodiment. The sensing element 1 includes a micro-heater 6 and thermopiles 7A and 7B. Here, the micro-heater 6 is an example of the "heating unit" of the present invention. The thermopiles 7A and 7B are examples of the "temperature sensing units" of the present invention. The micro-heater 6 is a restrictor made of polysilicon, for example, and is provided in the central portion of the sensing element 1. The thermopiles 7A and 7B are provided flanking the micro-heater 6.

Figure 4:
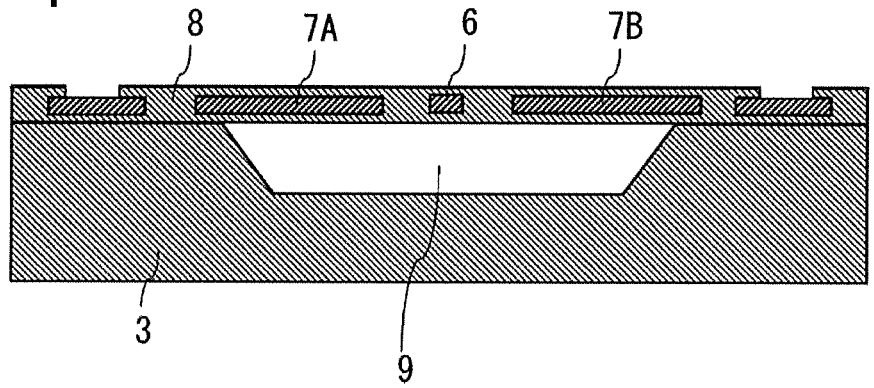
FIG. 4 schematically illustrates an example of a cross section of the flow rate measurement device.
Figure 5:
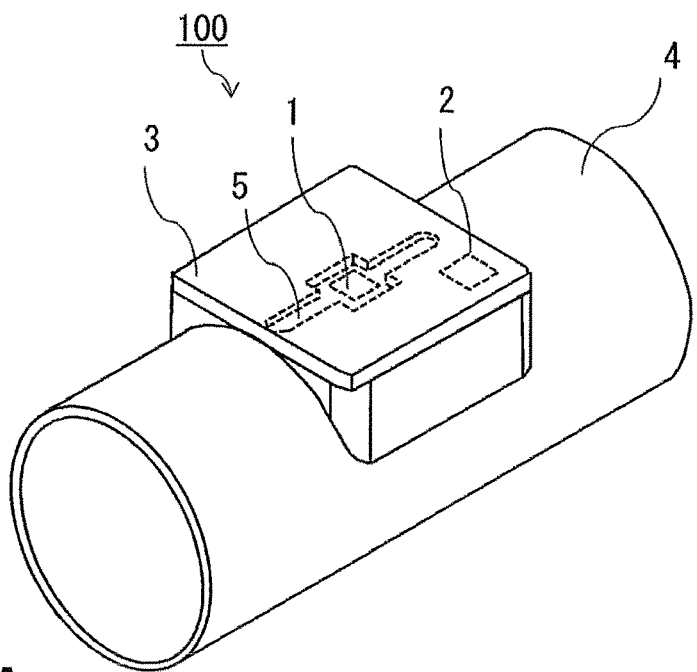
FIG. 5 schematically illustrates an example of a simplified diagram of when the flow rate measurement device is fixed to a flow pipe member.

FIG. 4 schematically illustrates an example of a cross section of the flow rate measurement device 100. An insulating thin-film 8 is formed above and below the micro-heater 6 and the thermopiles 7A and 7B. A cavity 9 is provided in the circuit board 3 below the thermopiles 7A and 7B. FIG. 5 schematically illustrates an example of a simplified diagram of when the flow rate measurement device 100 is fixed to the flow pipe member 4. The sensing element 1 is installed so as to fit into the central portion of the flow path 5. Also, the sensing element 1 is installed so that the thermopile 7A is on the upstream side in the fluid flow direction, and the thermopile 7B is on the downstream side.

Flow Rate Sensing Principle

Figure 6A:
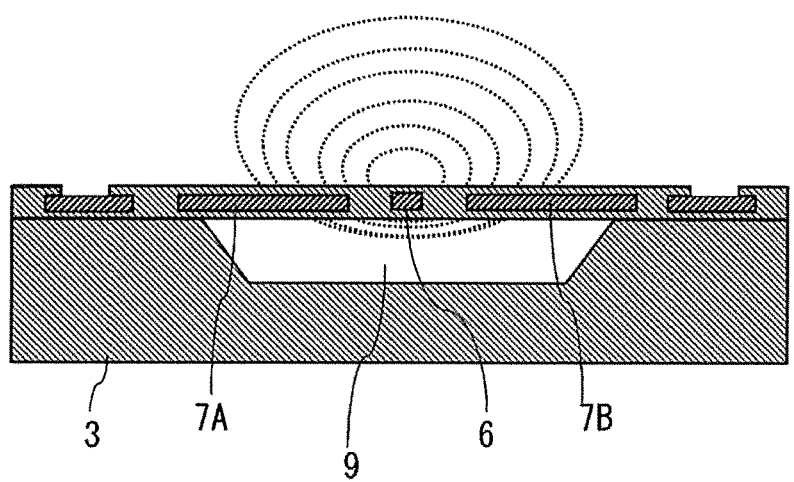
FIG. 6A schematically illustrates an example of the temperature distribution when a micro-heater is actuated in a state in which no fluid is flowing in the flow pipe member.
Figure 6B:
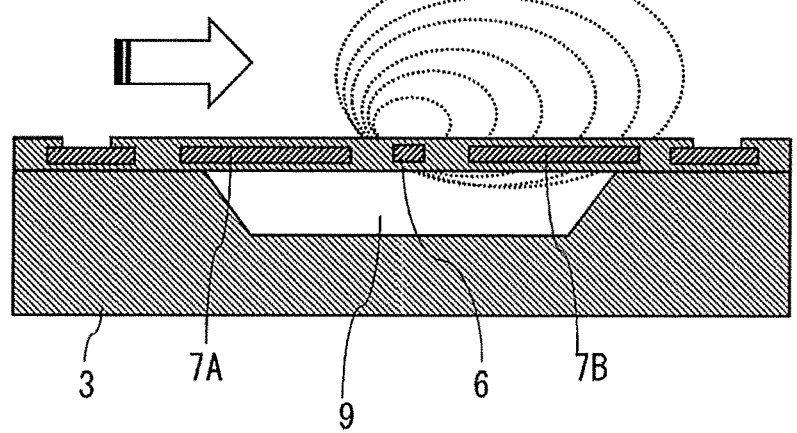
FIG. 6B schematically illustrates an example of the temperature distribution when the micro-heater is actuated in a state in which fluid is flowing through the flow pipe member.

Next, the principle of sensing the flow rate using the sensing element 1 will be described. FIG. 6A schematically illustrates an example of the temperature distribution when the micro-heater 6 is actuated in a state in which no fluid is flowing in the flow pipe member 4. Meanwhile, FIG. 6B schematically illustrates an example of the temperature distribution when the micro-heater 6 is actuated in a state in which a fluid is flowing through the flow pipe member 4. When no fluid is flowing through the flow pipe member 4, the heat from the micro-heater 6 diffuses symmetrically around the micro-heater 6. Therefore, there is no difference between the outputs of the thermopiles 7A and 7B. On the other hand, when a fluid is flowing through the flow pipe member 4, the heat from the micro-heater 6 is affected by the flow of the fluid and does not spread symmetrically around the micro-heater 6, instead diffusing further to the downstream thermopile 7B side. This produces a difference between the outputs of the thermopiles 7A and 7B. Also, the greater is the flow rate of the fluid, the greater is the difference between the outputs. The relation between the fluid flow rate and the difference between the outputs of the thermopiles 7A and 7B is expressed, for example, by the following Formula 1.

$$\Delta V = A \cdot (T_B - T_A)^b \sqrt{v_f} \qquad \text{Formula 1}$$

Here, $\Delta V$ is the flow rate of the fluid, $T_A$ is the output value from the thermopile 7A, and $T_B$ is the output value from the thermopile 7B. Also, $v_f$ is the flow velocity of the fluid, and A and b are constants. In this embodiment, the flow rate is calculated according to the principle discussed above.

The diffusion of heat in the area around the micro-heater 6 depends not only on the flow rate of the fluid, but also on characteristics such as the type of fluid. In other words, the type or other such the characteristics of the fluid can be calculated from the output of the thermopile 7A or 7B. The outputs of the thermopiles 7A and 7B are signals related to temperature. Therefore, it should go without saying that the temperature of the fluid can be sensed from the output of the thermopile 7A or 7B if the micro-heater 6 is shut off.

Functional Configuration

Figures 7, 8:
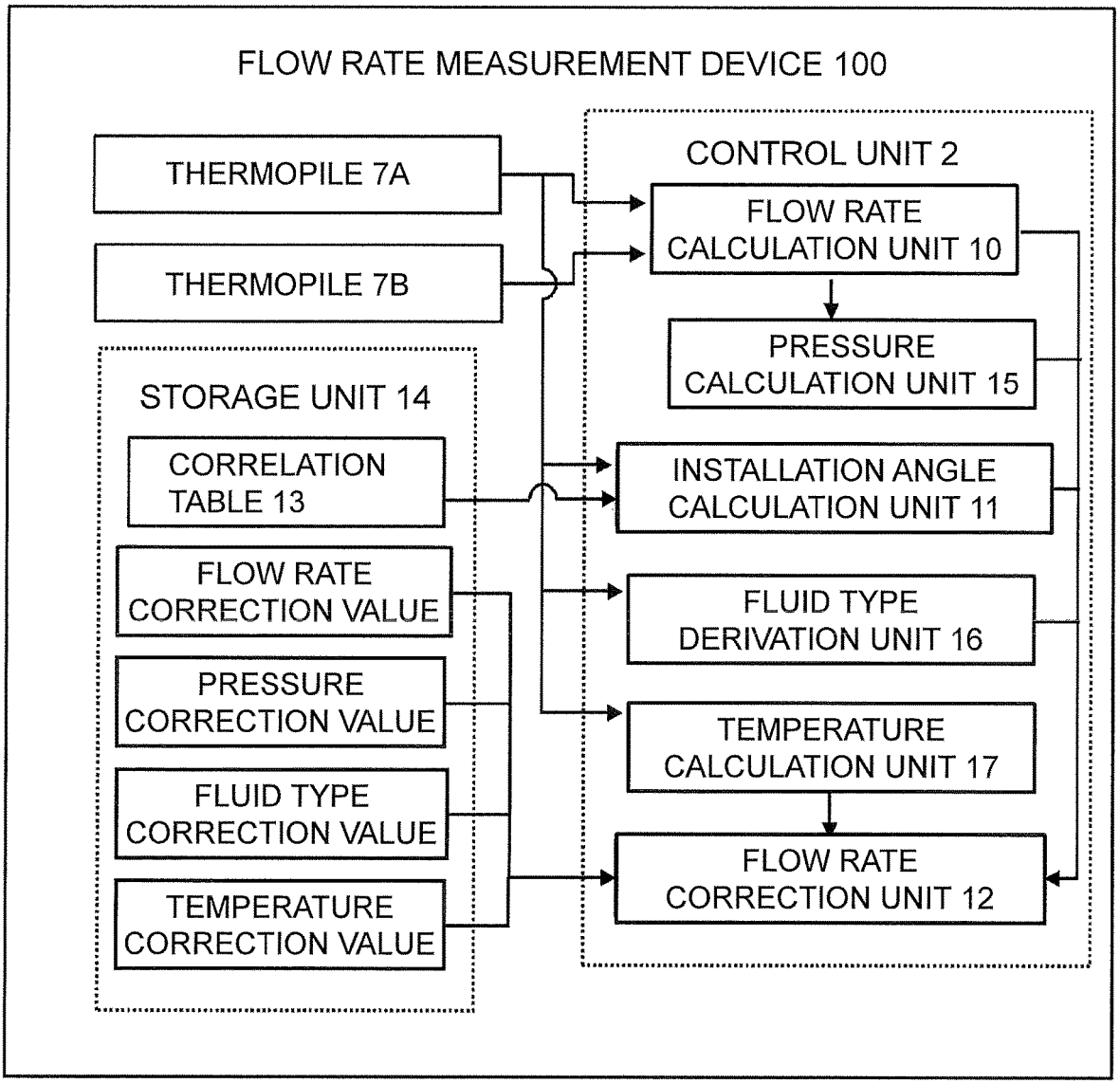
FIG. 7 schematically illustrates an example of a block diagram showing the functional configuration of the flow rate measurement device.
FIG. 8 schematically illustrates an example of a correlation table in which the correlation between the output of a thermopile and the installation angle is given.

FIG. 7 schematically illustrates an example of a block diagram showing the functional configuration of the flow rate measurement device 100. The control unit 2 comprises a flow rate calculation unit 10 that receives the signals outputted from the thermopiles 7A and 7B, and calculates the flow rate of the fluid from the difference between the outputs of the thermopiles 7A and 7B. The flow rate calculation unit 10 is an example of the "flow rate calculation unit" of the present invention. Formula 1 is used in calculating the flow rate of the fluid from the difference between the outputs of the thermopiles 7A and 7B.

When the fluid is heated by the micro-heater 6, convection occurs in the vicinity of the micro-heater 6, and the heat is carried upward with respect to the horizontal plane. FIG. 2 shows an example in which the flow rate measurement device 100 is installed in the flow path 5 such that the angle of the direction in which the micro-heater 6 and the thermopiles 7A and 7B are arranged with respect to the horizontal plane is approximately 90 degrees. The thermopiles 7A and 7B do not purely sense the heat diffusion caused by the flow of fluid, and instead sense the heat diffusion including heat movement caused by convection. That is, the flow rate must be corrected by taking into account the influence on heat by convection. Also, the degree of influence on heat movement caused by convection depends on the installation angle of the flow rate measurement device 100, the flow rate of the fluid, and the characteristics of the fluid (its pressure, type, and temperature). Therefore, it is necessary to correct the calculated flow rate by taking into account the installation angle of the flow rate measurement device 100, the flow rate of the fluid, and characteristics of the fluid (its pressure, type, and temperature).

In view of this, the control unit 2 comprises an installation angle calculation unit 11 that calculates the installation angle of the flow rate measurement device 100. The installation angle here is the angle of the thermopile 7A (short-side direction) in the direction in which the micro-heater 6 and the thermopiles 7A and 7B are arranged with respect to the horizontal plane, and is an example of the "tilt angle" of the present invention. That is, the installation angle calculation unit 11 calculates the angle of the direction in which the fluid is flowing with respect to the horizontal plane. The horizontal plane here is an example of the "specific reference plane" of the present invention. The installation angle calculation unit 11 is an example of the "angle calculation mean" of the present invention. In FIG. 7, the installation angle calculation unit 11 shows an example of receiving a signal outputted from the thermopile 7A. The control unit 2 also comprises a flow rate correction unit 12 that corrects the flow rate on the basis of the calculated installation angle and the flow rate of the fluid or the characteristics of the fluid (its pressure, type, and temperature).

Figures 9, 10A:
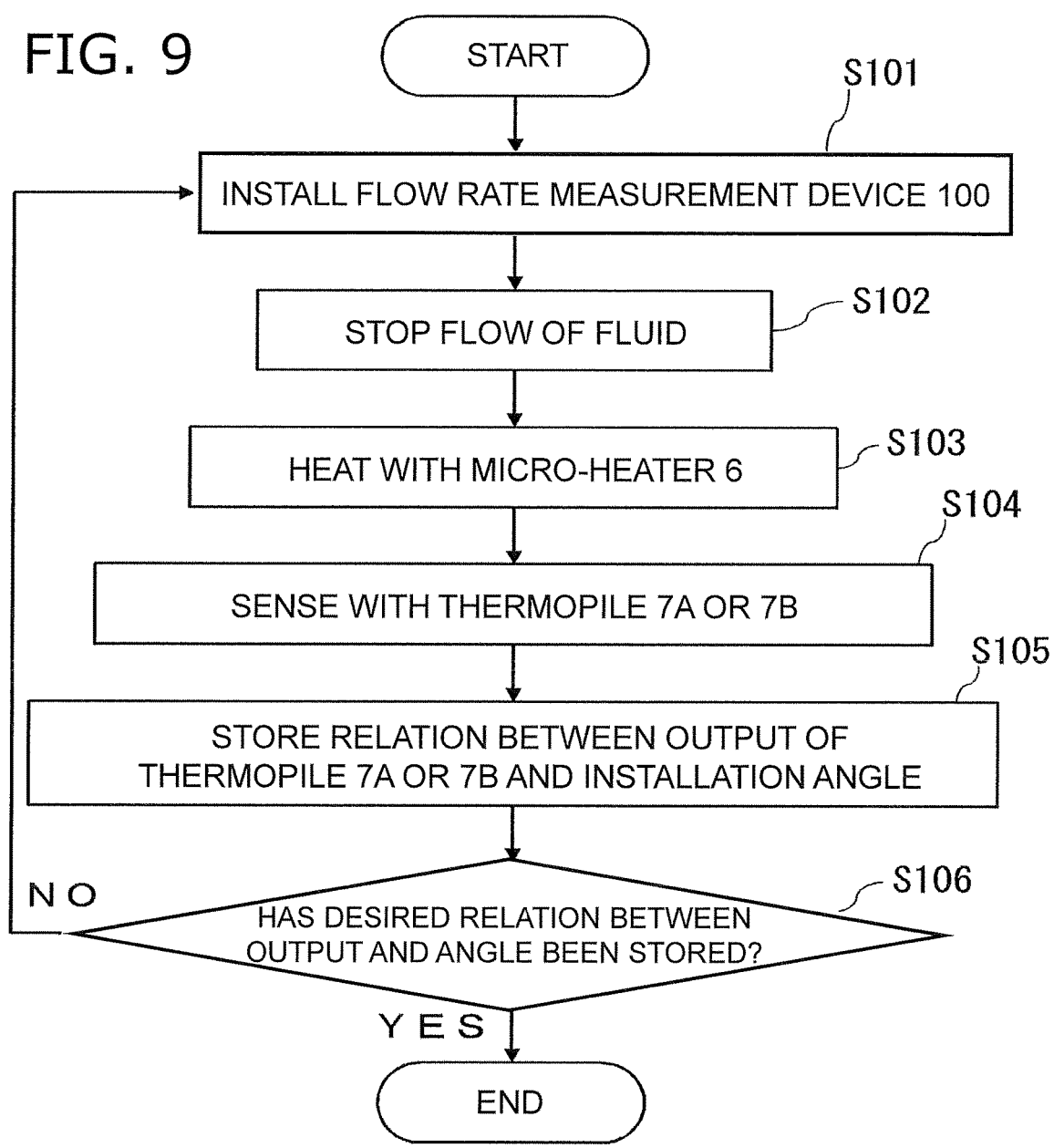
FIG. 9 schematically illustrates an example of a flowchart showing the calculation procedure for the correlation table.
FIG. 10A schematically illustrates an example of flow rate correction values.

In calculating the installation angle of the flow rate measurement device 100, the installation angle calculation unit 11 makes use of a correlation table 13 between the output of the thermopile 7A or 7B and the installation angle of the flow rate measurement device 100. The flow rate measurement device 100 comprises a storage unit 14, and the correlation table 13 is stored in this storage unit 14. FIG. 8 schematically illustrates an example of the correlation table 13 in which the correlation between the output of the thermopile 7A and the installation angle is given. The correlation table 13 should be created in advance. The correlation table 13 may also list the correlation between the output of the thermopile 7B and the installation angle. FIG. 9 schematically illustrates an example of a flowchart showing the calculation procedure used for the correlation table 13. The calculation procedure for the correlation table 13 shown in FIG. 9 will be described in detail below. The following calculation procedure is merely an example, though, and the various processing performed in the calculation procedure may be changed to the extent possible. Also, in the calculation procedure described below, steps can be omitted, replaced, and added as needed according to the embodiment.

Step S101

First, the flow rate measurement device 100 is installed inside the flow path 5 at a certain installation angle.

Step S102 Next, the flow of the fluid is stopped at the place where the flow rate measurement device 100 is provided.

Step S103

Next, the micro-heater 6 is actuated to heat the area around the micro-heater 6. This results in convection in the vicinity of the micro-heater 6, and the heat is carried upward with respect to the horizontal plane.

Step S104

Information about the heat distribution caused by convection is sensed by the thermopile 7A or 7B, and a specific signal is outputted from the thermopile 7A or 7B.

Step S105 The relation between the output of the thermopile 7A or 7B and the installation angle is stored. Then, the installation angle is changed and the above steps S101 to S105 are repeated.

Step S106

When the desired relation between the output of the thermopile 7A or 7B and the installation angle has been stored, the repetition of steps S101 to S105 is ended. The increments of the installation angle here may be any number of degrees.

The correlation table 13 created by the above procedure is stored in the storage unit 14 in advance.

The control unit 2 also comprises a pressure calculation unit 15 that calculates the pressure of the fluid, which is used when the flow rate correction unit 12 corrects the flow rate. Here, the pressure calculation unit 15 is an example of the "characteristic value calculation unit" of the present invention. The pressure calculation unit 15 receives the flow rate information calculated by the flow rate calculation unit 10, and calculates the pressure from the flow rate, the cross sectional area of the flow path 5, the fluid density, and so forth.

The control unit 2 also comprises a fluid type derivation unit 16 that derives the type of fluid, which is used when the flow rate correction unit 12 corrects the flow rate. The fluid type derivation unit 16 here is an example of the "characteristic value calculation unit" of the present invention. The fluid type derivation unit 16 receives the signal outputted from the thermopile 7A or 7B. FIG. 7 shows an example of receiving a signal outputted from the thermopile 7A.

The control unit 2 also comprises a temperature calculation unit 17 that calculates the temperature of the fluid, which is used when the flow rate correction unit 12 corrects the flow rate. The temperature calculation unit 17 here is an example of the "temperature calculation unit" of the present invention. The temperature calculation unit 17 receives the signal outputted from the thermopile 7A or 7B. FIG. 7 shows an example of receiving a signal outputted from the thermopile 7A.

Also, the storage unit 14 stores correction values that remove the influence of heat movement caused by convection from the calculated flow rate. These correction values are used when the flow rate correction unit 12 corrects the flow rate. One of the correction values is a flow rate correction value related to the flow rate of the fluid and the installation angle. FIG. 10A schematically illustrates an example of flow rate correction values. The flow rate correction value is an example of the "relation between the flow rate, the tilt angle, and the flow rate correction value" of the present invention.

Another of the correction values is a pressure correction value related to the installation angle and the fluid pressure. FIG. 10B schematically illustrates an example of pressure correction values. The pressure correction value is an example of the "relation between the characteristic value, the tilt angle, and the characteristic correction value" of the present invention.

Another of the correction values is a fluid type correction value related to the installation angle and the type of fluid. FIG. 10C schematically illustrates an example of fluid type correction values. The fluid type correction value is an example of the "relation between the characteristic value, the tilt angle, and the characteristic correction value" of the present invention.

Another of the correction values is a temperature correction value related to the installation angle and the temperature of the fluid. FIG. 10D schematically illustrates an example of temperature correction values. The temperature correction value is an example of the "relation between the characteristic value, the tilt angle, and the characteristic correction value" of the present invention.

§ 3 Operation Example

Figure 11:
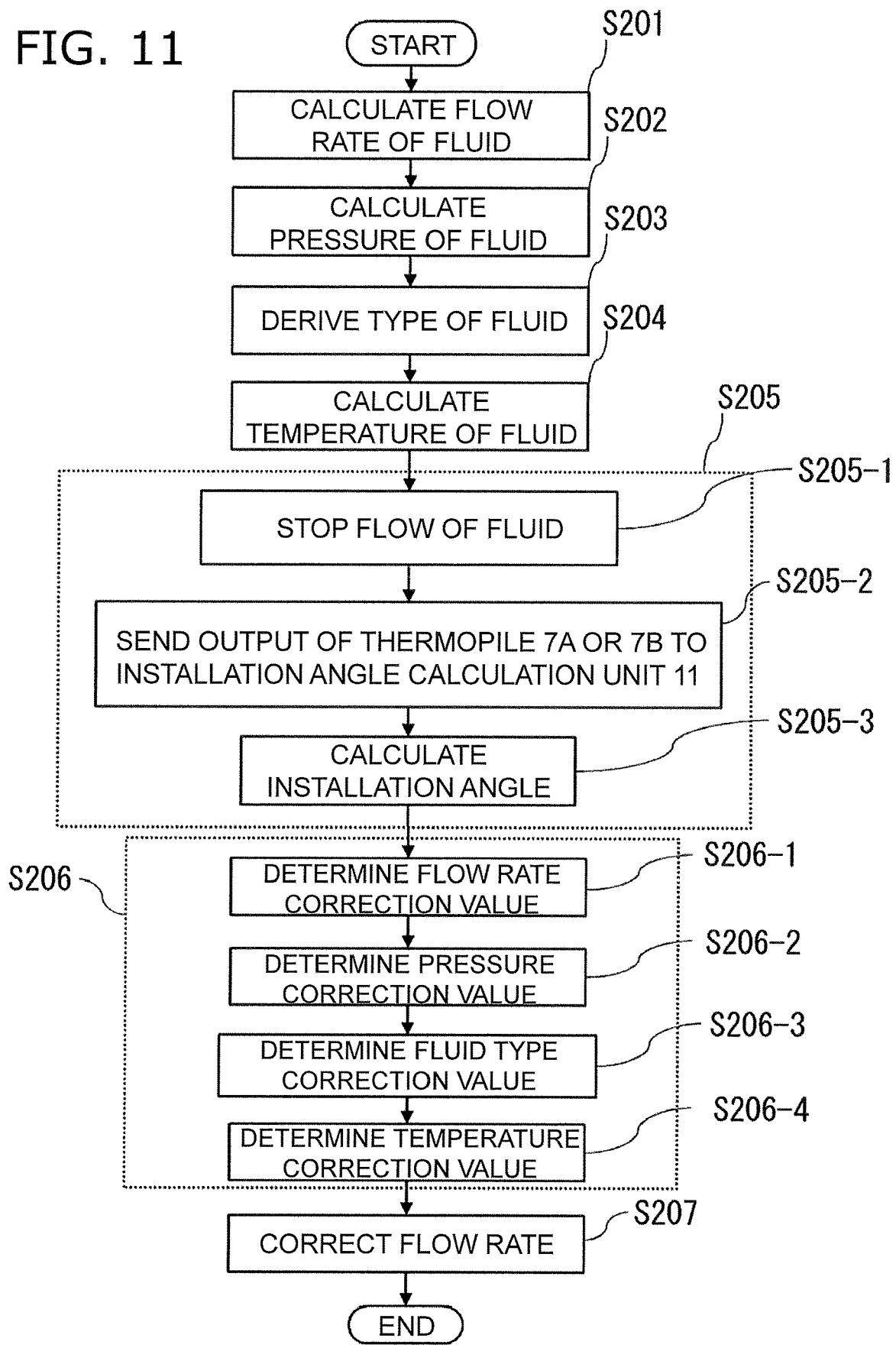
FIG. 11 schematically illustrates an example of a flowchart showing the processing procedure for the flow rate measurement device.

Next, an operation example of the flow rate measurement device 100 will be described with reference to FIG. 11. FIG. 11 schematically illustrates an example of a flowchart showing the processing procedure with the flow rate measurement device 100. The processing procedure described below is merely an example, and the various processing may be changed to the extent possible. Also, in the processing procedure described below, steps can be omitted, replaced, and added as needed according to the embodiment.

Step S201

The micro-heater 6 is actuated in a state in which fluid is flowing through the flow path 5. When the micro-heater 6 is actuated, the area around the micro-heater 6 is heated. Then, the thermopiles 7A and 7B output signals related to the temperature in the vicinity of the micro-heater 6. The outputs of the thermopiles 7A and 7B are transmitted to the flow rate calculation unit 10. The flow rate calculation unit 10 then calculates the flow rate of the fluid on the basis of the difference between the outputs of the thermopiles 7A and 7B.

Step S202 In the pressure calculation unit 15, pressure is calculated from the flow rate information received from the flow rate calculation unit 10, the cross sectional area of the flow path 5, the fluid density, and so forth.

Step S203

The output of the thermopile 7A or 7B is transmitted to the fluid type derivation unit 16. Then, in the fluid type derivation unit 16, the type of fluid is derived on the basis of the output of the thermopile 7A or 7B.

Step S204

The outputs of the thermopiles 7A and 7B are transmitted to the temperature calculation unit 17. The temperature calculation unit 17 then calculates the temperature of the fluid on the basis of the output of the thermopile 7A or 7B. However, the outputs of the thermopiles 7A and 7B transmitted to the temperature calculation unit 17 are outputs from when the operation of the micro-heater 6 has been shut off.

Step S205

Next, in step S205, the installation angle of the flow rate measurement device 100 is calculated.

Step S205-1

The flow of fluid is stopped at the place where the flow rate measurement device 100 is provided.

Step S205-2

Convection occurs in the vicinity of the micro-heater 6, and heat is carried upward with respect to the horizontal plane. When the flow of the fluid stops, information about the distribution of heat caused by convection is sensed by the thermopile 7A or 7B without being affected by the flow of the fluid, and the output of the thermopile 7A or 7B is transmitted to the installation angle calculation unit 11.

Step S205-3

The installation angle calculation unit 11 receives the output of the thermopile 7A or 7B. Then, with reference to the correlation table 13 stored in the storage unit 14, the installation angle corresponding to the output value closest to the received output value of the thermopile 7A or 7B is determined as the installation angle of the flow rate measurement device 100. However, the installation angle calculation unit 11 may instead calculate the installation angle of the flow rate measurement device 100 by referring to the correlation table 13, and apportioning the installation angles corresponding to the two output values before and after that are the closest to the received output value of the thermopile 7A or 7B. In step S205, the installation angle of the flow rate measurement device 100 can be found by the procedure given above.

Also, although the installation angle calculation unit 11 calculates the installation angle from the output of the thermopile 7A or 7B, the installation angle may instead be calculated from the difference between the outputs of the thermopiles 7A and 7B. In this case, the correlation table 13 of the difference between the outputs of the thermopiles 7A and 7B and the installation angle is created in advance.

Step S206

In step S206, the correction value that is used when the flow rate correction unit 12 corrects the flow rate is determined from among the correction values that are stored in the storage unit 14 and used in correcting the flow rate.

Step S206-1

In step S206-1, the flow rate correction value is determined. The flow rate correction value most suited to the flow rate calculated in step S201 and the installation angle calculated in step S205 is selected from among the flow rate correction value data as shown in FIG. 10A.

Step S206-2

In step S206-2, the pressure correction value is determined. The pressure correction value most suited to the pressure calculated in step S202 and the installation angle calculated in step S205 is selected from among the pressure correction value data shown in FIG. 10B.

Step S206-3

In step S206-3, a fluid type correction value is determined. The fluid type correction value most suited to the type of fluid derived in step S203 and the installation angle calculated in step S205 is selected from among the fluid type correction value data shown in FIG. 10C.

Step S206-4

In step S206-4, the temperature correction value is determined. The temperature correction value most suited to the temperature of the fluid calculated in step S204 and the installation angle calculated in step S205 is selected from among the temperature correction value data shown in FIG. 10D.

Step S207

In step S207, the flow rate is corrected by using the various correction values determined in step S206. More specifically, the flow rate correction unit 12 multiplies the flow rate correction value, the pressure correction value, the fluid type correction value, and the temperature correction value determined in step S206 by the flow rate calculated by the flow rate calculation unit 10 in step S201.

The flow rate measurement device 100 performs flow rate correction by executing the above steps S201 to S207.

Action and Effect

As described above, in this embodiment, the flow rate measurement device 100 can use the sensing element 1, which is a thermal flow sensor, to sense the distribution of heat caused by the flow of the fluid, and can calculate the flow rate of the fluid. The flow rate measurement device 100 can also find characteristics of the fluid, such as the fluid pressure, fluid type, and fluid temperature.

Also, the flow rate measurement device 100 can calculate the angle (installation angle) of the direction in which the micro-heater 6 and the thermopiles 7A and 7B are arranged with respect to the horizontal plane.

Then, the correction values most suited to the calculated flow rate, the installation angle, and the characteristics of the fluid (its pressure, type, and temperature) are selected from among the flow rate correction value, the pressure correction value, the fluid type correction value, and the temperature correction value stored in the storage unit 14, and the selected flow rate correction value, pressure correction value, fluid type correction value, and temperature correction value are multiplied by the calculated flow rate, thereby correcting the flow rate. That is, the flow rate measurement device 100 removes the influence of heat movement caused by convection from the calculated flow rate. This correction is based on the flow rate of the fluid, the characteristics (pressure, type, and temperature), and the installation angle of the flow rate measurement device 100. Therefore, the flow rate can be accurately corrected according to the installation angle of the flow rate measurement device 100, and the flow rate can be calculated with high accuracy.

Also, in this embodiment, the flow of the fluid is stopped when calculating the installation angle of the flow rate measurement device 100. Therefore, the output of the thermopile 7A or 7B is an output that reflects the distribution of heat caused by convection, and is not affected by the flow of the fluid. Therefore, the installation angle can be calculated with high accuracy.

Also, in this embodiment, since the flow rate is corrected on the basis of a plurality of characteristics of the fluid, namely, the pressure of the fluid, the type of fluid, and the temperature of the fluid, the flow rate can be calculated more accurately.

§ 4 Modification Examples

An embodiment of the present invention was described in detail above, but the above description is merely an example of the present invention in all respects. It should go without saying that various improvements and modifications can be made without departing from the scope of the present invention. For instance, the following changes are possible. In addition, those components that are the same as in the above embodiment are numbered the same, and description of things that are the same as in the above embodiment may be omitted. The following modifications can also be combined as needed.

4.1

Figure 12:
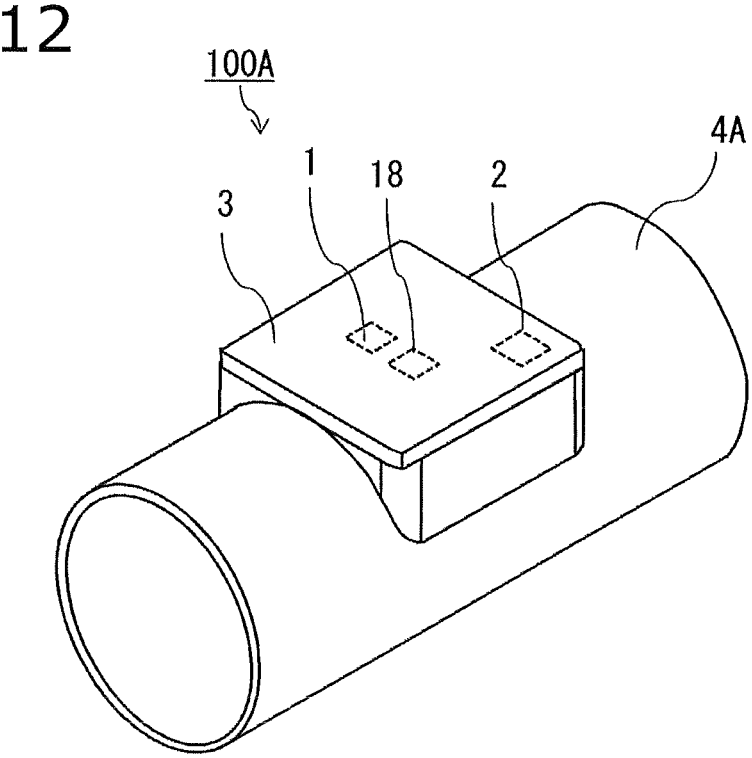
FIG. 12 schematically illustrates an example of an oblique view of a flow rate measurement device and a flow pipe member.

FIG. 12 schematically illustrates an example of an oblique view of a flow rate measurement device 100A and a flow pipe member 4A. As shown in FIG. 12, the flow rate measurement device 100A comprises a sensing element 18 in addition to the sensing element 1 and the control unit 2. Although not depicted, the flow pipe member 4A is provided with one flow path along the flow of the fluid, such as the flow path 5 of the flow pipe member 4, and the sensing element 1 and the sensing element 18 are provided side by side on this single flow path, in the direction of blocking the flow of fluid. The sensing element 18 is a thermal flow sensor of the same type as the sensing element 1, and, like the sensing element 1, comprises a micro-heater 6A and thermopiles 7C and 7D. Here, the micro-heater 6A is an example of the "second heating unit" of the present invention. The thermopiles 7C and 7D are examples of the "second temperature sensing units" of the present invention.

Figure 13:
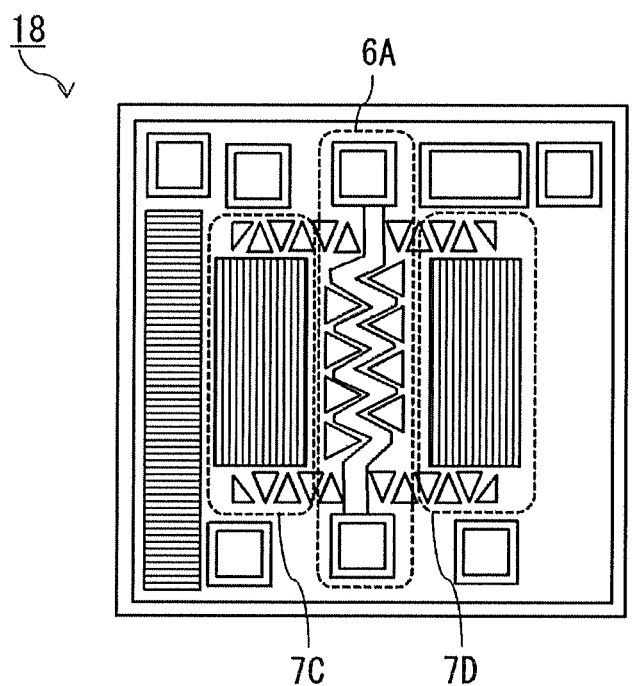
FIG. 13 schematically illustrates an example of the relation between the sensing elements and the flow of the fluid.
Figure 13:
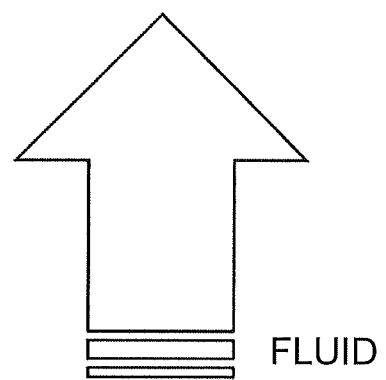

FIG. 13 schematically illustrates an example of the relation between the sensing element 18 and the flow of the fluid. The sensing element 18 is provided to one flow path of the flow pipe member 4A, in which the micro-heater 6A and the thermopiles 7C and 7D are arranged in the direction of blocking the flow of the fluid.

Here, since the temperature distribution is biased toward the downstream side due to the flow of the fluid, the change in the temperature distribution in the direction of blocking the flow is less than the change in the temperature distribution in the flow direction of the fluid. Accordingly, the change in the output characteristics of the thermopiles 7C and 7D produced by the change in the temperature distribution can be reduced. Therefore, it is possible to reduce the influence of a change in the temperature distribution due to the flow of the fluid, and measure the characteristic values produced by the sensing element 18.

Also, since the longitudinal direction of the micro-heater 6A is disposed along the flow direction of the fluid, the micro-heater 6A can heat the fluid over a wide range in the flow direction of the fluid. Therefore, even if the temperature distribution is biased to the downstream side due to the flow of the fluid, the change in the output characteristics of the thermopiles 7C and 7D can be reduced. Therefore, the characteristic value can be measured by the sensing element 18 while reducing the influence of change in the temperature distribution due to the flow of the fluid.

Furthermore, since the longitudinal direction of the thermopiles 7C and 7D is disposed along the flow direction of the fluid, the thermopiles 7C and 7D can sense the temperature over a wide range in the flow direction of the fluid. Accordingly, even if the temperature distribution is biased to the downstream side due to the flow of the fluid, the change in the output characteristics of the thermopiles 7C and 7D can be reduced. Therefore, the characteristic value can be measured while reducing the influence of change in the temperature distribution due to the flow of the fluid.

Figure 14:
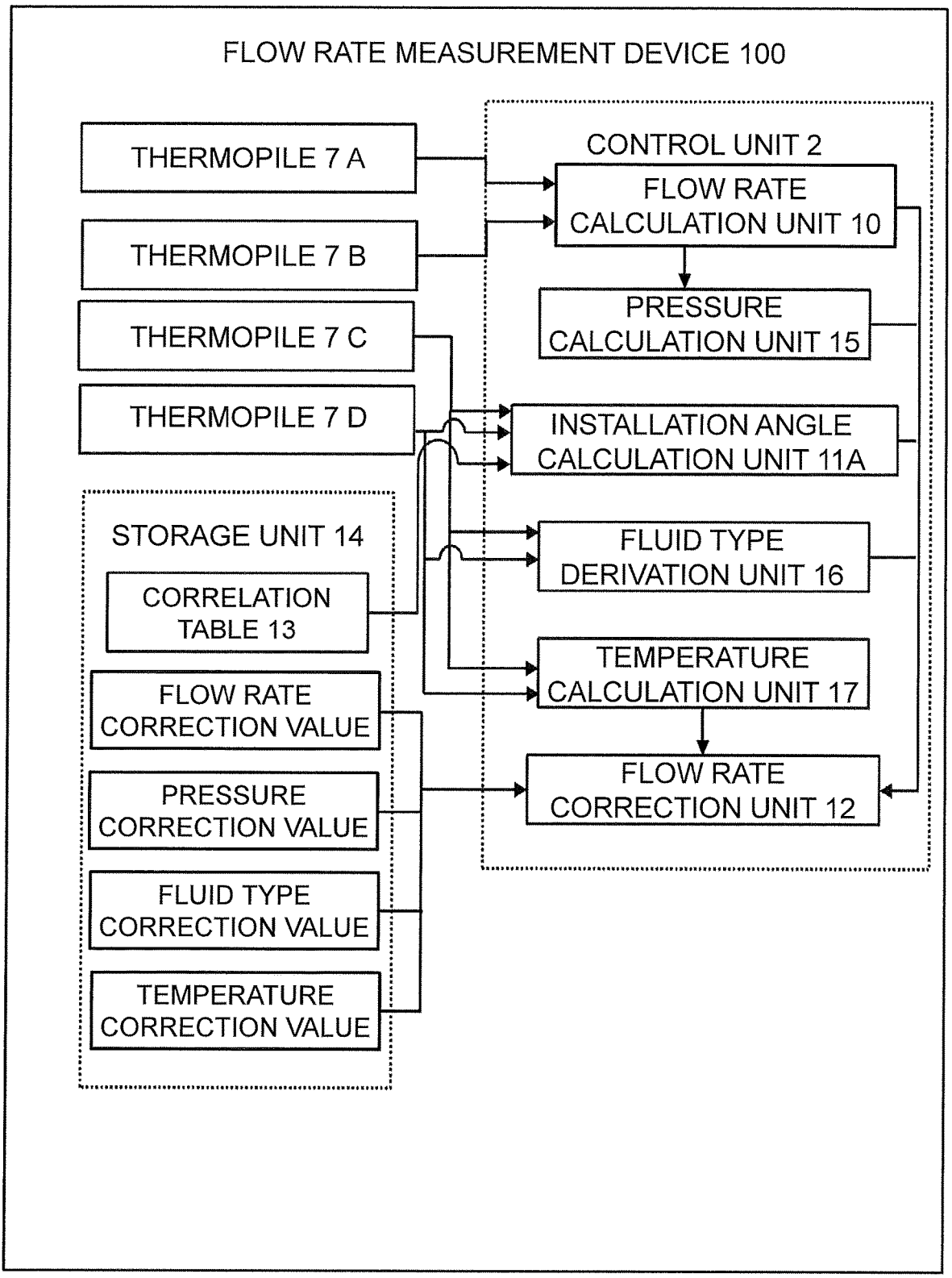
FIG. 14 schematically illustrates an example of a block diagram showing the functional configuration of the flow rate measurement device.

FIG. 14 schematically illustrates an example of a block diagram showing the functional configuration of the flow rate measurement device 100A. The flow rate measurement device 100A an installation angle calculation unit 11A that receives the output of the thermopile 7C or 7D, finds the output of the thermopile 7C or 7D, and calculates the angle in the direction in which the micro-heater 6A and the thermopile 7C, 7D are arranged with respect to the horizontal plane. That is, the installation angle calculation unit 11A calculates the angle of the direction in which the flow of the fluid is blocked with respect to the horizontal plane, for example. Here, the installation angle calculated by the installation angle calculation unit 11A is an example of the "tilt angle of the second temperature sensing unit" in the present invention. Also, the relation between the output of the thermopile 7C or 7C and the installation angle of the flow rate measurement device 100 is created in advance. Then, the installation angle of the flow rate measurement device 100A is calculated from the relation between the output of the thermopile 7C or 7D and the installation angle of the flow rate measurement device 100.

However, the output of the thermopiles 7C and 7D is less affected by the flow of fluid. Therefore, in calculating the installation angle in the installation angle calculation unit 11A, there is no need to stop the fluid flow as in step S205-1.

The storage unit 14 of the flow rate measurement device 100A stores the angle of the direction in which the micro-heater 6A and the thermopiles 7C and 7D are arranged with respect to the horizontal plane, and correction values related to the flow rate of the fluid or the characteristics (pressure, type, and temperature) of the fluid.

Also, in this modification example, the fluid type derivation unit 16 and the temperature calculation unit 17 receive the output of the thermopiles 7C and 7D and find the average value of the output of the thermopiles 7C and 7D. Then, the type of fluid and the temperature of the fluid are calculated from the average value of the output of the thermopiles 7C and 7D.

Action and Effect

With the flow rate measurement device 100A described above, in calculating the installation angle, the type of fluid, and the temperature of the fluid, the output of the thermopiles 7C and 7D is used after the influence of the change in the temperature distribution due to the flow of the fluid has been reduced. This allows the installation angle, the type of fluid, and the fluid temperature to be calculated with high accuracy. Also, the accuracy of flow rate correction can be improved by using the installation angle, type of fluid, and fluid temperature that have thus been calculated with high accuracy. Also, in this modification example, in calculating the installation angle in the installation angle calculation unit 11A, there is no need to stop the flow of the fluid as in step S205-1. Therefore, the installation angle can be easily sensed.

4.2

In the modified example in section 4.1, the installation angle calculation unit 11A used the output of the thermopiles 7C and 7D to calculate the angle of the direction in which the fluid flow is blocked with respect to the horizontal plane, but. In the installation angle calculation unit 11 may instead calculate the angle of the fluid flow direction with respect to the horizontal plane.

With the flow rate measurement device 100A described above, the storage unit 14 stored the angle of the flow direction of the fluid with respect to the horizontal plane, correction values related to the flow rate, the pressure, fluid type, and temperature, the angle of the direction in which the flow of the fluid is blocked with respect to the horizontal plane, and correction values related to the flow rate, pressure, fluid type, and temperature.

Action and Effect

With the flow rate measurement device 100A described above, in addition to the effect in the modification example in section 4.1, two installation angles can be calculated, that is, the sensing element 1 can be used by the installation angle calculation unit 11 to calculate the angle of the fluid flow direction with respect to the horizontal plane, and the sensing element 18 can be used by the installation angle calculation unit 11A to calculate the angle in the direction in which the fluid flow is blocked with respect to the horizontal plane. This allows the inclination of the flow rate measurement device 100A to be ascertained three-dimensionally. Also, the calculated flow rate can be corrected according to the two installation angles. This allows the flow rate to be accurately corrected, and the flow rate to be calculated with high accuracy.

4.3

Figure 15:
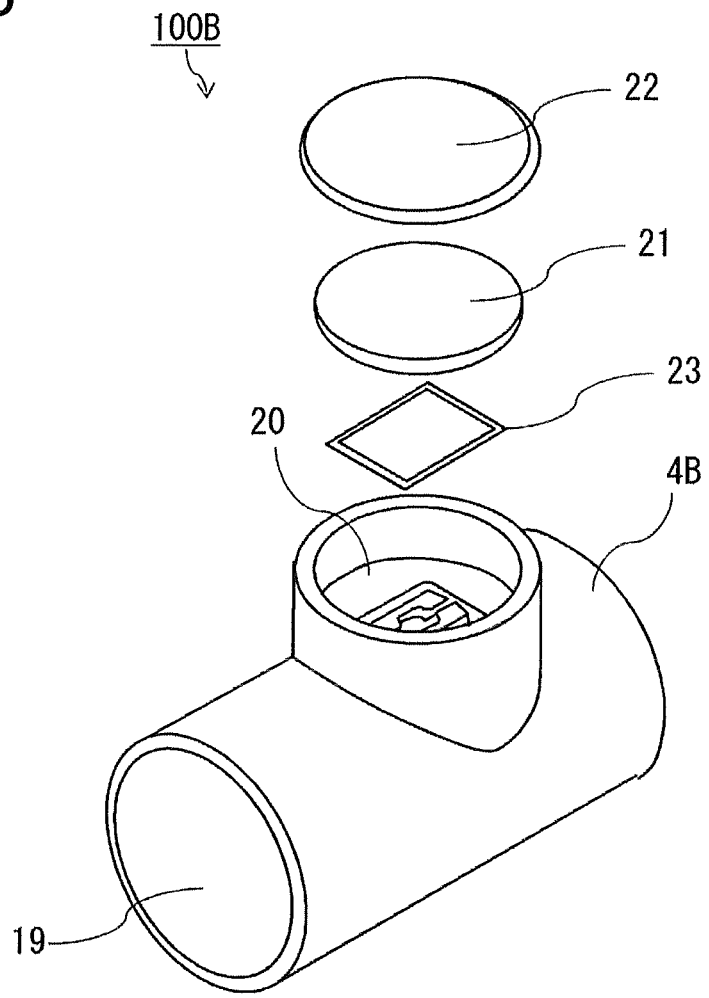
FIG. 15 schematically illustrates an example in which the flow rate measurement device is provided to a flow pipe member comprising two flow path portions: a main flow path portion and an auxiliary flow path portion.

In the modified examples in sections 4.1 and 4.2, the sensing element 1 and the sensing element 18 are provided to a single flow path of the flow pipe member 4A, but the sensing element 1 and the sensing element 18 may be provided to separate flow paths. FIG. 15 schematically illustrates an example in which a flow rate measurement device 100B is provided to a flow pipe member 4B comprising two flow path portions: a main flow path portion 19 and an auxiliary flow path portion 20.

Figure 16:
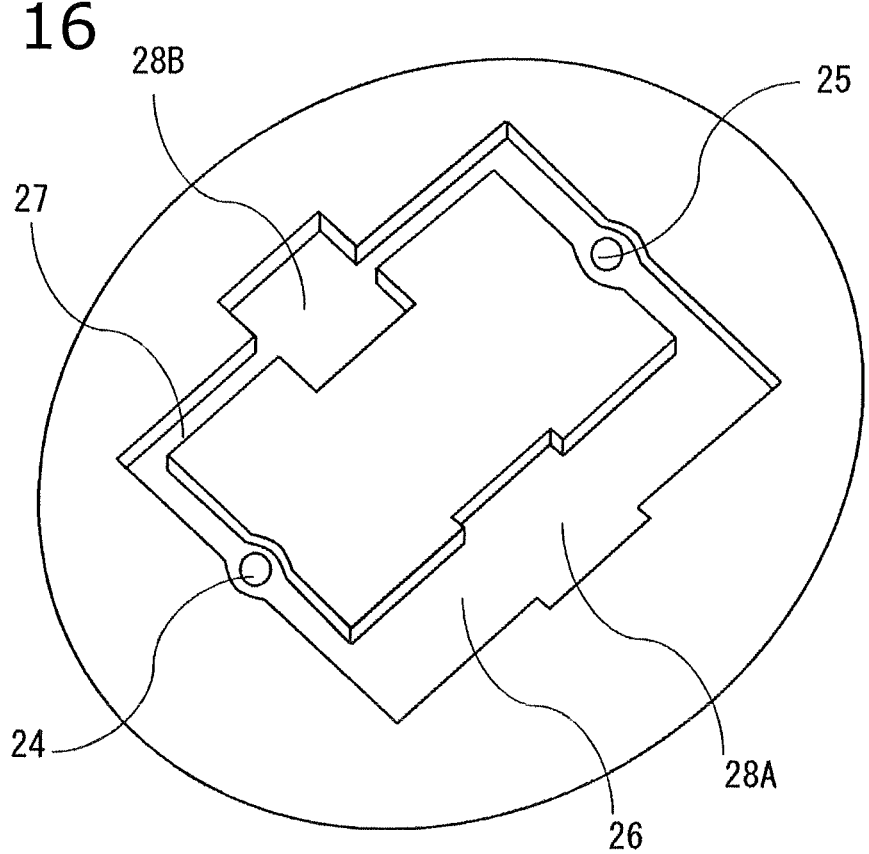
FIG. 16 schematically illustrates an example of a detail view of the auxiliary flow path portion.

Here, the flow rate measurement device 100B comprises a disc-shaped circuit board 21, a cover 22 that covers the outer surface of the circuit board 21, and a seal 23 that adhesively affixes the circuit board 21 and the flow pipe member 4B. Also, the flow pipe member 4B is equipped with two flow path portions, a main flow path portion 19 and an auxiliary flow path portion 20. The main flow path portion 19 is a tubular member. The auxiliary flow path portion 20 is located on one side of the main flow path portion 19, and an has auxiliary flow path formed inside it. FIG. 16 schematically illustrates an example of a detail view of the auxiliary flow path portion 20. The main flow path portion 19 and the auxiliary flow path portion 20 communicate with each other through an inflow flow path 24 and an outflow flow path 25. The auxiliary flow path portion 20 comprises a first flow path 26 that branches off from the inflow flow path 24 and to which the sensing element 1 is provided, and a second flow path 27 that branches off from the inflow flow path 24 and to which the sensing element 18 is provided. Also, the first flow path 26 and the second flow path 27 branching off from the inflow flow path 24 merge to form the outflow flow path 25.

The first flow path 26 is a substantially U-shaped flow path. The first flow path 26 has a sensing element disposition portion 28A, to which is provided the sensing element 1 used for sensing the flow rate of the fluid, located at a point along the longitudinal direction (the direction parallel to the main flow path portion 19).

The second flow path 27 is also a substantially U-shaped flow path, like the first flow path 26. The second flow path 27 has a sensing element disposition portion 28B, to which is provided the sensing element 18 that measures the thermal diffusivity of the fluid, located at a point along the longitudinal direction (the direction parallel to the main flow path portion 19). Here, although not depicted, the micro-heater 6A and the thermopiles 7C and 7D of the sensing element 18 are provided side by side in the direction of blocking the flow of fluid.

The method for fixing the flow rate measurement device 100B to the flow pipe member 4B is as follows. First, the auxiliary flow path portion 20 and the circuit board 21 are adhesively affixed by the seal 23. After this, the surface of the circuit board 21 is covered with the cover 22. This fixing method ensures that the inside of the auxiliary flow path portion 20 will be airtight. Therefore, the air outside the flow pipe member 4B will not enter the auxiliary flow path portion 20 and affect the sensing of the flow rate and physical properties.

Figure 17:
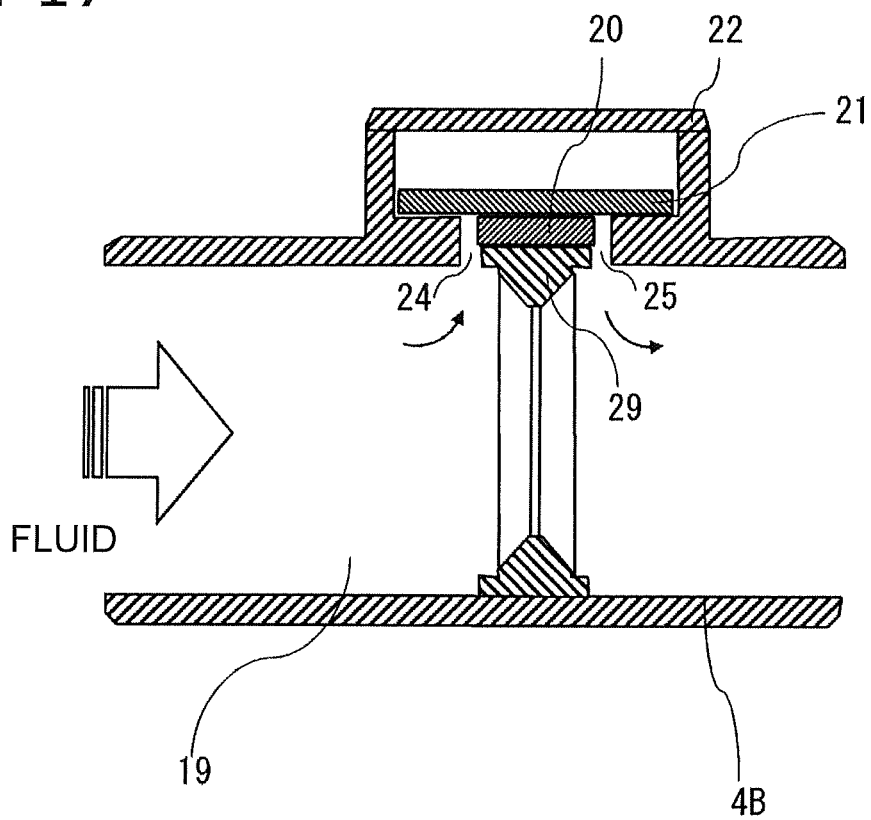
FIG. 17 schematically illustrates an example of a cross section when the flow rate measurement device is provided to a flow pipe member.

FIG. 17 schematically illustrates an example of a cross section when the flow rate measurement device 100B is provided to the flow pipe member 4B. The flow pipe member 4B comprises a restrictor 29 in the vicinity of the auxiliary flow path portion 20. When fluid flows through the main flow path portion 19, the flow of some of the fluid is blocked by the restrictor 29 and flows through the inflow flow path 24 into the auxiliary flow path portion 20. Then, fluid having the same temperature, pressure, and other such physical properties flows into the first flow path 26 and the second flow path 27 branching off from the auxiliary flow path portion 20.

Action and Effect

With this flow rate measurement device 100B, the flow rates of the fluid that is split up into the first flow path 26 and the second flow path 27 can be individually controlled by adjusting the width of each flow path. Therefore, the flow rate of the fluid flowing through the first flow path 26 can be controlled according to the sensing range of the sensing element 1, and the flow rate of the fluid flowing through the second flow path 27 can be controlled according to the sensing range of the sensing element 18.

Therefore, the flow rate measurement device 100B can sense the physical properties value of the fluid at the optimal flow rate according to the specific sensing range of each sensing element, so the sensing accuracy can be increased. This allows the flow rate and the characteristic values to be accurately calculated and corrected.

4.4

Also, in the above embodiment, the installation angle of the flow rate measurement device was calculated by the sensing element 1 or 18, but the installation angle of the flow rate measurement device may also be sensed by providing a tilt sensor, rather than using the sensing elements 1 and 18. Here, the tilt sensor is an example of the "angle calculation unit" of the present invention. In this case, the installation angle calculation unit receives the signal outputted from the tilt sensor, and calculates the tilt angle of the thermopiles with respect to a specific reference plane, that is, the installation angle of the flow rate measurement device. With this modification example, the installation angle of the flow rate measurement device can be sensed without using the output of the thermopiles.

Also, in the above embodiment, the reference plane for the installation angle of the flow rate measurement device was the horizontal plane, but any plane that serves as a reference may be used.

Also, in the above embodiment, the installation angle was calculated from the output of the thermopiles, but the flow rate may be corrected without calculating the installation angle.

Also, the installation angle in the above embodiment can be calculated without restriction of direction by using information about the outputs of the thermopiles and the difference between the outputs of the thermopiles. That is, the installation angle calculation unit 11, for example, can use information about the outputs of the thermopiles 7A and 7B and the difference between the outputs of the thermopiles 7A and 7B to calculate not only the installation angle in the flow direction of the fluid with respect to the horizontal plane, but also the installation angle in the direction of blocking the flow. Also, the installation angle calculation unit 11A, for example, can use information about the outputs of the thermopiles 7C and 7D and the difference between the outputs of the thermopiles 7C and 7D to calculate not only the installation angle in the direction of blocking the flow with respect to the horizontal plane, but also the installation angle in the flow direction of the fluid.

Also, in a modification example of the above embodiment, the installation angle of the flow rate measurement device, the type of fluid, and the temperature of the fluid were calculated from the average value of the outputs of the thermopiles 7C and 7D, but the installation angle of the flow rate measurement device, the type of fluid, and the temperature of the fluid may instead be calculated from the output of just the thermopile 7C or the thermopile 7D.

4.5

Figure 18:
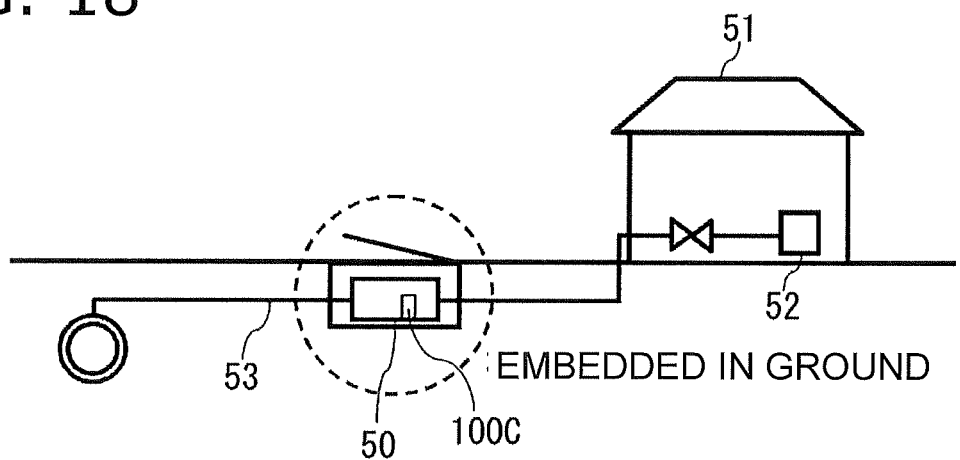
FIG. 18 schematically illustrates an example of when the flow rate measurement device is installed in a gas meter that is embedded in the ground.

FIG. 18 schematically illustrates an example of when a flow rate measurement device 100C is installed in a gas meter 50 that is embedded in the ground. Conventional gas meters have been made smaller and designed for being embedded in the ground for the sake of architectural considerations. A membrane-type gas meter is an example of a conventional gas meter, but it was difficult to make such meters smaller due to restrictions imposed by metering principles. In view of this, turbine type and fluidic type gas meters have been developed, but the results have not been satisfactory. Therefore, at present, gas meters are made more compact by putting USMs (ultrasonic meters) into practical use.

However, a conventional gas meter makes use of a safety device in the form of a pressure sensor (using atmospheric pressure as a reference) that monitors the pressure of the supply gas, so a vent for communicating with the atmosphere must be provided to the housing of a gas meter that incorporates a pressure sensor, and this makes it difficult to bury the meter in the ground because there is a possibility that the vent will be submersed in water.

The gas meter 50 shown in FIG. 18 is an underground gas meter, which is provided, for example, along an underground pipe 53 through which passes the gas supplied to an appliance 52 in a house 51 where the gas is used. The flow rate measurement device 100C is provided inside the gas meter 50 and measures the flow rate of gas.

Figure 19:
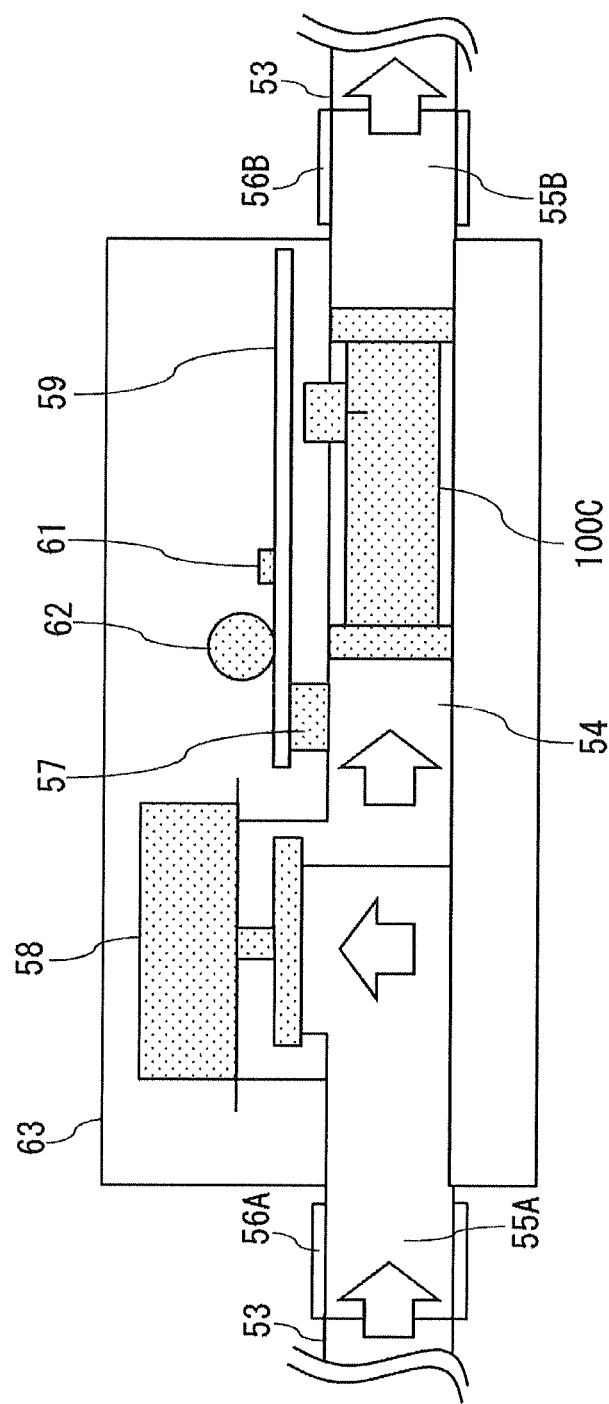
FIG. 19 schematically illustrates an example of a detail view of the gas meter.

FIG. 19 schematically illustrates an example of a detail view of the gas meter 50. A flow pipe member 54 through which gas passes is provided in the interior of the gas meter 50. The gas meter 50 is provided along the pipe 53 and comprises connection screws 56A and 56B for linking the flow pipe member 54 and the pipe 53 and fixing linking portions 55A and 55B, respectively. Here, the gas meter 50 is provided so that the linking direction of the linking portion 55A and the linking direction of the linking portion 55B face in the same direction (the lateral direction in the example in FIG. 19).

Figure 20:
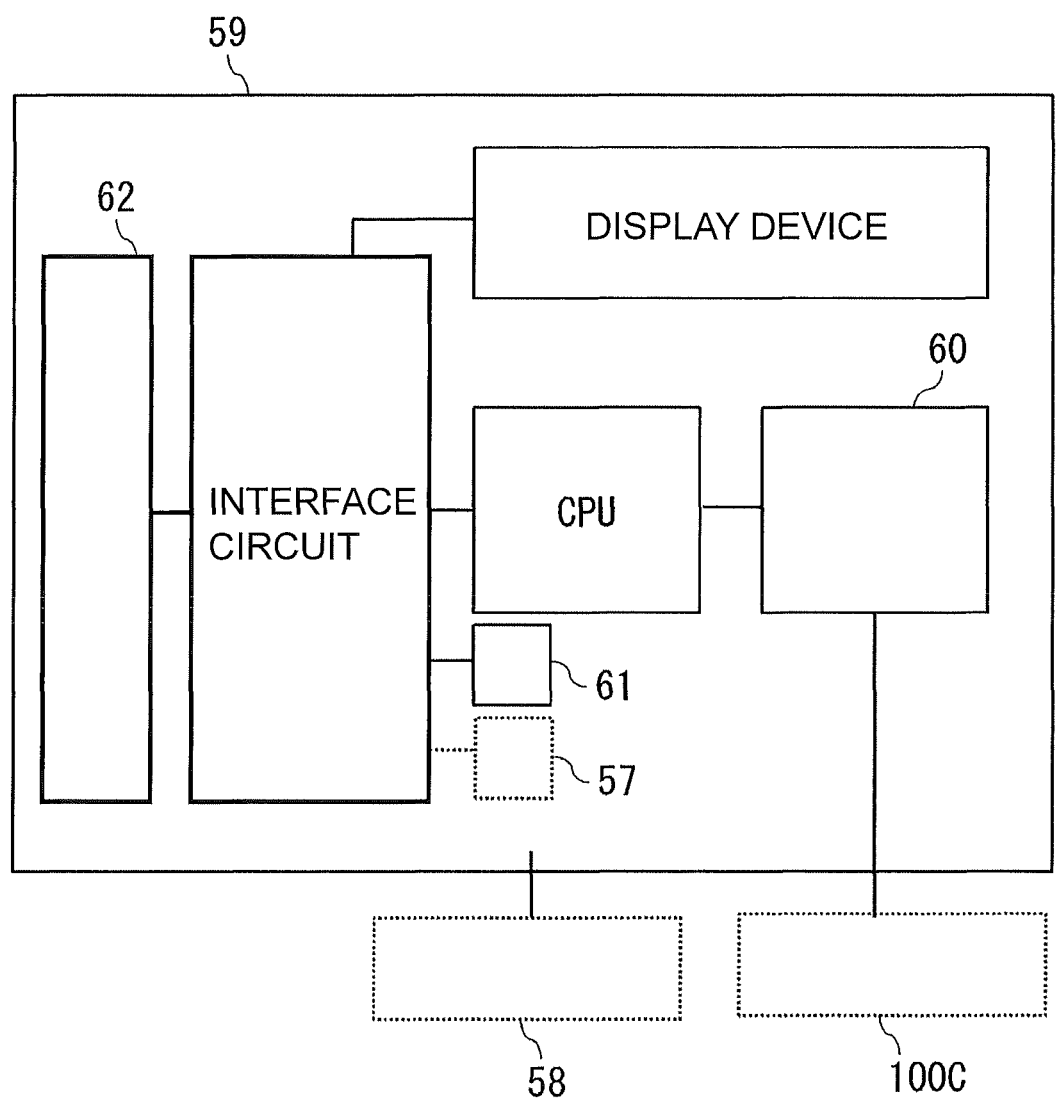
FIG. 20 schematically illustrates an example of the configuration of an electronic board.

The gas meter 50 comprises the flow rate measurement device 100C that measures the gas passing through the inside of the flow pipe member 54. In addition to the flow rate measurement device 100C, the gas meter 50 comprises an absolute pressure sensor 57 that senses the supply pressure of the gas flowing through the flow pipe member 54. The absolute pressure sensor 57 here is provided so as to be linearly aligned with the flow rate measurement device 100C. The gas meter 50 also comprises a shutoff valve 58 that blocks the flow of gas in the flow pipe member 54. The gas meter 50 also comprises an electronic board 59. FIG. 20 schematically illustrates an example of the configuration of the electronic board 59. A metal wiring pattern is formed on the surface of the electronic board 59, and the wiring pattern and the flow rate measurement device 100C are electrically connected. A custom measurement IC (integrated circuit) 60 for measuring the output from the flow rate measurement device 100C is mounted on the surface of the electronic board 59. The wiring pattern on the electronic board 59 is electrically connected to the shutoff valve 58. The aperture of the shutoff valve 58 is controlled by an element mounted on the surface of the electronic board 59. The gas meter 50 also comprises a seismic sensor 61 that is provided on the electronic board 59 and detects an earthquake and actuates the shutoff valve 58 to shut off the flow of gas if the shaking is above a predetermined value. The absolute pressure sensor 57 is mounted on the rear surface of the electronic board 59. The gas meter 50 also comprises a battery 62 that is provided on the electronic board 59 and generates electricity for driving the flow rate measurement device 100C, the shutoff valve 58, the absolute pressure sensor 57, and the like. The gas meter 50 also comprises a housing 63 that protects the flow rate measurement device 100C, the absolute pressure sensor 57, the shutoff valve 58, the electronic board 59, various elements on the electronic board 59, the flow pipe member 54, and so forth.

With the gas meter 50 described above, since the absolute pressure sensor 57 provided in the gas meter 50 does not need a vent to the atmosphere, the housing 63 can be sealed. This allows the gas meter 50 to be embedded. Also, since the gas meter 50 is sealed, the inside of the flow pipe member 54 is unlikely to be affected by changes in the external environment, and the environment (temperature, humidity, etc.) is more stable. Therefore, highly accurate flow rate measurement can be performed with the gas meter 50.

Also, with the gas meter 50 described above, the linking portions 55A and 55B linking the flow pipe member 54 and the pipe 53 are facing in the same direction. This means that the straight pipe length of the flow pipe member 54 can be made as long as possible. Therefore, the gas flow in the flow pipe member 54 is more stable than the gas flow in a curved pipe. This allows the gas meter 50 to perform highly accurate flow rate measurement.

Also, with the gas meter 50 described above, the flow rate measurement device 100C and the various sensors such as the absolute pressure sensor 57 are disposed linearly. This makes it easier to dispose the flow pipe member 54 linearly than when the various sensors are not disposed linearly, but irregularly. That is, the gas meter 50 can have a simpler structure, and the number of members forming the gas meter 50 can be easily reduced. Therefore, the measurement of gas is more efficient, and the cost of manufacturing the gas meter 50 is reduced.

Also, with the gas meter 50 described above, the gas flow rate is sensed by a single element such as the flow rate measurement device 100C, which allows the gas meter 50 to be more compact. Also, a horizontal piping structure is possible with which the influence of flow rate measurement error due to convection is reduced.

Also, when a conventional gas meter is embedded in the ground, it is considered difficult to recognize from above ground the installation angle of the flow rate measurement device provided to the gas meter. Therefore, if the installation angle of the flow rate measurement device is inclined with respect to the horizontal plane, it is considered difficult to correct the measured flow rate according to this inclination. However, with the embedded gas meter 50 equipped with the flow rate measurement device 100C as described above, even if the installation angle of the flow rate measurement device 100C is inclined with respect to the horizontal plane, the gas measured by the flow rate measurement device 100C is automatically corrected according to the installation angle of the flow rate measurement device 100C. This makes highly accurate flow rate measurement possible. Also, even in a situation where the flow rate measurement device 100C is difficult to install at the desired angle, such as when the ground surface is sloped to start with, the gas measured by the flow rate measurement device 100C will be automatically corrected according to the installation angle of the flow rate measurement device. That is, the gas meter 50 is a very convenient device with which highly accurate flow rate measurement is possible regardless of the installation environment.

Also, the shutoff valve 58 provided to the gas meter 50 is preferably disposed so as to be linearly aligned with the flow rate measurement device 100C and the absolute pressure sensor 57. This is because when the shutoff valve 58 is provided in this manner, even if the aperture of the shutoff valve 58 is changed, turbulence in the gas flow inside the flow pipe member 54 will be reduced and will have less effect on the gas measurement performed by the flow rate measurement device 100C or the absolute pressure sensor 57.

The embodiments and modification examples disclosed above can be combined with each other.

In addition, in order to allow a comparison of the constituent features of the present invention with the configuration in a working example, the constituent features of the present invention will be described by using the reference numerals in the drawings.

Invention 1

A flow rate measurement device (100), comprising:

a heating unit (6) configured to heat a fluid;

temperature sensing units (7A and 7B) that are provided flanking the heating unit (6) in the direction of fluid flow, and configured to sense the temperature of the heated fluid;

a flow rate calculation unit (10) configured to calculate the flow rate of the fluid on the basis of a sensing signals outputted from the temperature sensing units (7A and 7B);

angle calculation unit (11) configured to calculate the tilt angle of the temperature sensing units (7A and 7B) with respect to a specific reference plane;

a storage unit (14) configured to store the relation between the flow rate, the tilt angle, and a flow rate correction value; and a flow rate correction unit (12) configured to correct the flow rate by using the flow rate correction value stored in the storage unit (14).

Invention 2

The flow rate measurement device (100) according to invention 1, wherein the angle calculation unit (11) calculates the tilt angle on the basis of the output of the temperature sensing units (7A and 7B) when no fluid is flowing.

Invention 3

The flow rate measurement device (100) according to invention 1 or 2, further comprising a characteristic value calculation unit (15, 16, 17) that calculates a characteristic value of a fluid on the basis of the sensing signals outputted from the temperature sensing units (7A and 7B), wherein the storage unit (14) further stores the relation between the characteristic value, the tilt angle, and a characteristic correction value, and the flow rate correction unit (12) further corrects the flow rate by using the characteristic correction value stored in the storage unit (14).

Invention 4

The flow rate measurement device (100A, 100B) according to invention 1 or 2, further comprising:

a second heating unit (6A);

second temperature sensing units (7C and 7D) that are provided flanking the second heating unit (6A) in the direction of blocking the flow of fluid; and a characteristic value calculation unit (15, 16, 17) that calculates a characteristic value of the fluid on the basis of the sensing signals outputted from the second temperature sensing units (7C and 7D), wherein the angle calculation unit (11A) further calculates the tilt angle of the second temperature sensing units with respect to a specific reference plane on the basis of the output of the second temperature sensing units (7C and 7D).

Invention 5

A flow rate measurement device (100A, 100B), comprising:
a heating unit (6) for heating a fluid;
temperature sensing units (7A and 7B) that are provided flanking the heating unit (6) in the direction of fluid flow, and that sense the temperature of the heated fluid;
a flow rate calculation unit (10) that calculates the flow rate of the fluid on the basis of the sensing signals outputted from the temperature sensing units (7A and 7B);
a second heating unit (6A);
second temperature sensing units (7C and 7D) provided flanking the second heating unit (6A) in the direction of blocking the flow of fluid;
a characteristic value calculation unit (15, 16, 17) that calculates a characteristic value of the fluid on the basis of the sensing signals outputted from the second temperature sensing units (7C and 7D);
angle calculation unit (11A) for calculating the tilt angle of the second temperature sensing units (7C and 7D) with respect to a specific reference plane on the basis of the output of the second temperature sensing units (7C and 7D);
a storage unit (14) that stores the relation between the flow rate, the tilt angle of the second temperature sensing units (7C and 7D), and the flow rate correction value, and also stores the relation between the characteristic value, the tilt angle of the second temperature sensing units (7C and 7D), and the characteristic correction value; and
a flow rate correction unit (10) that corrects the flow rate by using the flow rate correction value and the characteristic correction value stored in the storage unit (14).

Invention 6

The flow rate measurement device (100, 100A, 100B) according to any of inventions 3 to 5,
wherein the characteristic value represents at least one of the pressure, type, and temperature of the fluid.

Invention 7

An embedded gas meter (50) that is embedded in the ground, comprising:
a flow pipe (54) through which the gas entering the embedded gas meter (50) flows; and
the flow rate measurement device (100C) according to any of inventions 1 to 6,
wherein the flow rate measurement device (100C) is installed in the flow pipe (54) and senses the flow rate of gas flowing through the flow pipe.

REFERENCE SIGNS LIST 1, 18 . . . sensing element
2 . . . control unit
3, 21 . . . circuit board
4, 4A, 4B . . . flow pipe member
5 . . . flow path
6, 6A . . . micro-heater
7, 7A, 7B, 7C, 7D . . . thermopile
8 . . . insulating thin film
9 . . . cavity
10 . . . flow rate calculation unit
11, 11A . . . installation angle calculation unit
12 . . . flow rate correction unit
13 . . . correlation table
14 . . . storage unit
15 . . . pressure calculation unit
16 . . . fluid type derivation unit
17 . . . temperature calculation unit
19 . . . main flow path portion
20 . . . auxiliary flow path portion
22 . . . cover
23 . . . seal
24 . . . inflow flow path
25 . . . outflow flow path
26 . . . first flow path
27 . . . second flow path
28A . . . sensing element disposition portion
28B . . . sensing element disposition portion
29 . . . restrictor
50 . . . embedded gas meter
51 . . . house
52 . . . appliance
53 . . . pipe
54 . . . flow pipe member
55A, 55B . . . linking portion
56A, 56B . . . connection screw
57 . . . absolute pressure sensor
58 . . . shut-off valve
59 . . . electronic board
60 . . . custom IC for measurement
61 . . . seismic sensor
62 . . . battery
63 . . . housing
100, 100A, 100B, 100C . . . flow rate measurement device

The invention claimed is:

1. A flow rate measurement device, comprising:
a heating unit configured to heat a fluid;
a temperature sensing unit that are provided flanking the heating unit in a direction of fluid flow, and configured to sense a temperature of the heated fluid;
a flow rate calculation unit configured to calculate a flow rate of the fluid on the basis of a sensing signals outputted from the temperature sensing units;
an angle calculation unit configured to calculate a tilt angle of the temperature sensing units with respect to a specific reference plane;
a storage unit configured to store a relation between the flow rate, the tilt angle, and a flow rate correction value; and
a flow rate correction unit configured to correct the flow rate by using the flow rate correction value stored in the storage unit.

2. The flow rate measurement device according to claim 1,
wherein the angle calculation unit calculates the tilt angle on the basis of an output of the temperature sensing units when no fluid is flowing.

3. The flow rate measurement device according to claim 1,
further comprising a characteristic value calculation unit configured to calculate a characteristic value of a fluid on the basis of the sensing signals outputted from the temperature sensing units,
wherein the storage unit further stores a relation between the characteristic value, the tilt angle, and a characteristic correction value, and the flow rate correction unit further corrects the flow rate by using the characteristic correction value stored in the storage unit.

4. The flow rate measurement device according to claim 1, further comprising:
a second heating unit;
second temperature sensing units that are provided flanking the second heating unit in a direction of blocking the flow of fluid; and
a characteristic value calculation unit configured to calculate a characteristic value of the fluid on the basis of the sensing signals outputted from the second temperature sensing units,
wherein the angle calculation unit further calculates a tilt angle of the second temperature sensing units with respect to a specific reference plane on the basis of an output of the second temperature sensing units.

5. A flow rate measurement device, comprising:
a heating unit configured to heat a fluid;
a temperature sensing unit that are provided flanking the heating unit in a direction of fluid flow, and configured to sense a temperature of the heated fluid;
a flow rate calculation unit configured to calculate a flow rate of the fluid on the basis of a sensing signals outputted from the temperature sensing units;
a second heating unit;
second temperature sensing units provided flanking the second heating unit in a direction of blocking the flow of fluid;
a characteristic value calculation unit configured to calculate a characteristic value of the fluid on the basis of the sensing signals outputted from the second temperature sensing units;
an angle calculation unit configured to calculate a tilt angle of the second temperature sensing units with respect to a specific reference plane on the basis of an output of the second temperature sensing units;
a storage unit configured to store a relation between the flow rate, the tilt angle of the second temperature sensing units, and a flow rate correction value, and also store a relation between the characteristic value, the tilt angle of the second temperature sensing units, and a characteristic correction value; and
a flow rate correction unit configured to correct the flow rate by using the flow rate correction value and the characteristic correction value stored in the storage unit.

6. The flow rate measurement device according to claim 3,
wherein the characteristic value represents at least one of a pressure, type, and temperature of the fluid.

7. An embedded gas meter that is embedded in a ground, comprising:
a flow pipe through which the gas entering the embedded gas meter flows; and
the flow rate measurement device according to claim 1,
wherein the flow rate measurement device is installed in the flow pipe and senses the flow rate of gas flowing through the flow pipe.

\* \* \* \* \*